(12) United States Patent
Noh

(10) Patent No.: US 7,844,988 B2
(45) Date of Patent: Nov. 30, 2010

(54) REAL TIME CHANNEL GROUPING METHOD AND THE APPARATUS THEREOF

(75) Inventor: Young-Joong Noh, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1230 days.

(21) Appl. No.: 10/834,025

(22) Filed: Apr. 29, 2004

(65) Prior Publication Data

US 2004/0221306 A1   Nov. 4, 2004

(30) Foreign Application Priority Data

Apr. 30, 2003   (KR)   ............... 10-2003-0027800

(51) Int. Cl.
  *H04N 5/445*   (2006.01)
(52) U.S. Cl. ............... 725/46; 725/43; 725/44; 725/56
(58) Field of Classification Search ............ 725/46, 725/43, 44, 56
  See application file for complete search history.

(56) References Cited

U.S. PATENT DOCUMENTS

| | | | | |
|---|---|---|---|---|
| 5,900,916 | A * | 5/1999 | Pauley | 725/59 |
| 6,115,080 | A * | 9/2000 | Reitmeier | 348/731 |
| 6,978,473 | B1 * | 12/2005 | Nsonwu et al. | 725/52 |
| 7,080,394 | B2 * | 7/2006 | Istvan et al. | 725/43 |
| 2004/0040039 | A1 * | 2/2004 | Bernier | 725/46 |
| 2004/0064835 | A1 * | 4/2004 | Bellwood et al. | 725/87 |
| 2004/0221306 | A1 * | 11/2004 | Noh | 725/44 |
| 2007/0124763 | A1 * | 5/2007 | Ellis | 725/35 |

FOREIGN PATENT DOCUMENTS

| | | |
|---|---|---|
| JP | 10-65978 A | 3/1998 |
| KR | 2001-0103207 A | 11/2001 |
| KR | 2002-0088220 A | 11/2002 |

* cited by examiner

*Primary Examiner*—Joseph P Hirl
*Assistant Examiner*—Jivka Rabovianski
(74) *Attorney, Agent, or Firm*—Sughrue Mion, PLLC

(57) ABSTRACT

A real time preference channel grouping apparatus and method are disclosed. The apparatus receives a preference channel grouping setting signal, a display demand signal, and a group selection signal, stores user selection-guide information according to the preference channel grouping setting signal and the display demand signal, processes a received signal and the user selection-guide information to display on display device, and groups preference channels according to the signal of the key input unit and allows the preference channels and the user selection-guide information to be concurrently displayed. Thus, the user can perform real time grouping for channels to watch for each desired time and easily retrieve only the grouped channels, and hence it is possible to reduce the time for selecting favorite channels.

33 Claims, 18 Drawing Sheets

US 7,844,988 B2

REAL TIME CHANNEL GROUPING METHOD AND THE APPARATUS THEREOF

The present application claims priority from Korean Patent Application No.2003-27800, filed on Apr. 30, 2003, which is incorporated in full herein by reference.

BACKGROUND

1. Field of the Invention

The present invention generally relates to the field of broadcasting channel selection, and more particularly to a real time channel grouping capable of easily switching preference channels among broadcasting channels for each desired time.

2. Description of the Related Art

At present, there are various channels broadcasted across the country from ground wave to cable. About 280 channels have been assigned for ground wave and cable broadcasting, and 9999 channels (in case no minor channels are provided) or 999 channels (in case minor channels are provided) are provided for digital satellite system (DSS).

However, not every user regularly watches so many channels. Usually, viewers watch their favorite channels on certain days and at specific times among the many channels. Therefore, in order for a user to watch his favorite channels for specific days and times, it takes a substantial amount of time to select the desired viewing channels among the many available channels.

An approach to overcome the above-mentioned problem is a method of providing preference channel list. For example, the preference channel list is a system in which the channels or programs that the user frequently watches or likes are stored as the preference channel list.

An example of technology using the preference channel list is disclosed in Korean laid-open patent publication 2002-0088220. The preference channel setting and switching method according to the related art will be described with reference to the attached drawings. FIG. 1 is a block diagram showing the television configuration disclosed in the publication, FIGS. 2a and 2b are flow charts describing a method of giving a priority rank to the preference channel disclosed in the publication, and FIG. 3 shows an embodiment listing the priority rank of the preference channels disclosed in the publication.

As shown in FIG. 1, the television configuration disclosed in the publication comprises a key input processing unit 10 for determining whether or not the respective preference channels inputted through an external input means (not shown) by a user are set, and processing the preference channel information according to the priority rank for the respective preference channels; a controlling unit 11 for allowing the preference channels to be switched based on the preference channel information; a first memory unit 12 for temporarily storing the preference channel information selected by the user; a second memory unit 20 for storing the list of the preference channels and the preference channel information, if the preference channel information is finally set for each channel; I2C (Inter-Integrated Circuit) driving unit 21 for controlling the I2C bus, so that the preference channel list and the preference channel information can be stored in the second memory 20; and an image signal processing unit 22 for processing the image signal received from the external input means depending on the user's channel selection.

The external input means may be a key panel mounted on a remote controller or on a television unit. The user inputs a channel to be designated as the preference channel and the priority rank for the designated channel using the external input means. Such preference channel information as whether or not the preference channel is designated and the priority rank thereof, inputted through the external input means, is inputted to the controlling unit 11 via the key input processing unit 10. Then, the controlling unit 11 allows the preference channel list and the preference channel information to be stored in the first and second memories 12 and 20 by processing preference channel information such as whether the preference channel is designated and the priority rank thereof. Based on the preference channel information, the preference channel is switched, if there exists the external input. The preference channel information is processed by the controlling unit 11 and then stored in the first memory 12, and the I2C driving unit 21 provides data communication so that the preference channel list and the preference channel information can be stored in the second memory 20. Here, the preference channel list and the preference channel information stored in the second memory 20 are the information inputted in the channel editing mode by the user, the information being such that the designation of the preference channel and the setting of the priority rank thereof has been completed.

In addition, the second memory unit 20 may be updated based on the user's setting. At this time, the storage type of the preference channel information is as follows. For example, a first bit indicates whether or not the preference channel is designated, that is, the preference channel or other general channel, and a fourth bit and a fifth bit indicate the priority rank for the preference channel. If the values of the fourth bit and the fifth bit are "0, 1", respectively, this indicates the preference channel having the lowest priority; if the values of the fourth bit and the fifth bit are "1, 0", respectively, this indicates the preference channel having the middle priority; and if the values of the fourth bit and the fifth bit are "1, 1", respectively, this indicates the preference channel having the highest priority. As described above, the usage of two or more bits allows the priority rank for the preference channel to be given.

If the user comes to input the preference channel function key during the operation of the broadcasting mode by the completion of the setting of the preference channel and the priority rank thereof, the switching operation of the preference channel is performed according to the preference channel list and the preference channel information stored in second memory 20.

Hereinafter, with reference to the attached drawings, description will be made of a method in which the preference channel is set and the priority rank thereof is given as disclosed in the publication. As shown in FIG. 2A, the user first selects a channel setting edit mode in an automatic channel state (steps S31-S32). Then, the user selects a channel in the channel setting edit mode via the remote controller or key panel (step S33), and determines if the selected channel is set as a preference channel (step S34). As the result of the determination (S34), if the user wishes to set the selected channel as the preference channel, the user registers/stores the selected channel in the preference channel list via the preference channel key of the remote controller or key panel and simultaneously gives the priority rank for that preference channel (step S35). Subsequently, the user can interrupt the channel setting edit mode (step S36), and if it is not interrupted, the user can select another channel and the above-described procedures (step S37) are iteratively performed.

Here, the method in which the priority rank for the preference channel is given is, for example, a scheme for displaying specific symbol in such a way that if the user selects channel 7 (CH7) once, one specific symbol is displayed, and if the user selects channel 7 (CH7) three times, three specific symbols are displayed, thereby reflecting the priority rank for the preference channel.

Accordingly, as shown in FIG. 3, the channels corresponding to TV general broadcasting (or ground wave broadcasting) are channel 2 denoted by shading, channel 6, channel 7, channel 13, channel 14, channel 16, channel 27, channel 35, channel 37, channel 40, and channel 45, and among these channels, channel 7, channel 13, channel 16, channel 27, channel 35 and channel 45 that are denoted by a specific symbol are the preference channels.

Also, the channel sequence of the preference channels is channel 7, channel 13, channel 16, channel 35, channel 27, and channel 45, that is, the priority sequence from channels 7 and 13 having a larger number of the channel preference symbols to channels 27 and 45 having a lesser number of the channel preference symbols.

Accordingly, since the user gives the priority rank for the set respective preference channels, it is possible to improve the efficiency of the preference channel search/switch.

Hereinafter, with reference to the attached drawings, description will be made of an embodiment of an operation of a television having the preference channel set and having the priority rank for the preference channels set.

As shown in FIG. 2B, the user first turns ON the power of digital TV (step S41), and sets receiving mode (step S42). In this case, in setting the receiving mode, the user sets whether the receiving mode is a general broadcasting mode including ground wave broadcasting, cable broadcasting, digital broadcasting, or an external input mode including DVD, VCR. It is determined if the receiving mode selected by the user, i.e., the present watching mode is the general broadcasting mode (step S43).

As the result of the determination (S43), if it is determined not to be the general broadcasting mode, the watching mode such as DVD, VCR corresponding to the external input mode selected by the user is performed (step S45). If it is determined to be the general broadcasting mode, the general broadcasting mode is performed (step S44). Then, if the input of the preference channel function key is carried out by the user while watching the general broadcasting (step S46), the channel is switched depending on the sequence of the priority rank given the channels registered in the preference channel list (step S47). For example, if the user inputs the preference channel function key via the external input means while watching the TV general broadcasting channel 14, the channel switching is performed starting from the favorite channel, that is, in the order of CH7, CH13, CH16, CH35, CH27, CH45, according to the priority rank for the preference channel set by the user. The sequence to be displayed is determined based on the level of importance of the priority rank.

As a consequence, if the user gives the priority rank for the preference channel and inputs the preference channel function key while watching the digital TV, the channel switching is performed according to the given priority rank.

However, in the preference channel setting method according to the related art, there is a problem that since the preference channel is set among the broadcasting channels that are watched, after the setting of the preference channel, although the sequence to be displayed (the sequence to be displayed being determined based on the importance of the priority rank) is manually determined and inputted, many steps are necessary to determine the preference channel, and it is difficult to do so quickly. In addition, in case too many preference channels are set, there is another problem, namely that it is very time consuming to search for a desired channel even among the preference channels. In other words, unless the user thinks of the sequence of the screen that he seeks to watch, the user needs to wait for a long time until the desired channel is displayed.

SUMMARY

The present invention has been made in order to solve the foregoing and other problems. Accordingly, it is an object of the present invention to provide a channel grouping method and apparatus to allow a user to group desired channels into a plurality for each desired time or day of television viewing and allowing those channels for the respective groups to be easily retrieved. Thereby the user can classify the desired channels for desired times into groups so as easily to select and to watch the desired channels.

It will be understood that a user may group desired channels by a time at which the user watches the corresponding group of preferred channels, and/or preferred channels may be grouped by a day, such as a day of the week, at which the group of desired channels is usually watched by the user. Similarly, a user may wish to group channels by genre of program typically broadcast on certain preferred channels or by some other classification of preferred channels. Also, various users, such as members of a family or household, sharing the use of a television set and/or a stand-alone apparatus or other apparatus or unit incorporating a system or method according to the present invention, may each have one or more groups of preferred channels, thus simplifying for any given user the preferred channel selection and viewing process.

In order to achieve an object of the present invention, a first embodiment of a real time grouping apparatus according to the present invention comprises: a key input unit configured to process a preference channel group setting signal, a display demand signal, and a group selection signal through external input means; a GUI screen storage unit configured to store user selection-guide information according to the preference channel group setting signal and the display demand signal; a signal processing unit configured to process a received signal and the user selection-guide information to display on display device; and a controlling unit configured to group preference channels according to the signal of the key input unit, and to allow the preference channels to be displayed and concurrently to allow the user selection-guide information of the GUI screen storage unit to be displayed.

In addition, when the preference channel grouping setting signal or the display demand signal is inputted, the controlling unit allows guide information for selecting group to store or display the received channel as the preference channel to be displayed, and channels included in preset group to be sequentially displayed for a certain period.

In a preferred embodiment, the guide selection information for selecting the group is such that the group that can be selected by the user is displayed, and when the user moves a group using the group selection signal, the controlling unit allows channels set in the moved group whenever the group is moved to be displayed on the display device for a certain period.

On the other hand, when the user selects the group in which the received channel is to be stored, the controlling unit allows the received channel to be displayed on the display device by storing the received channel in the selected group and performing the OFF operation of the user guide screen.

When the user selects preference channel to be displayed, the selected preference channel is displayed on display device and the user guide screen is turned OFF.

In order to achieve the object of the present invention, the second embodiment of the real time grouping apparatus according to the present invention comprises: a key input unit for processing preference channel grouping setting signal, display demand signal, and group selection signal through external input means; GUI screen storage unit for storing user guide information according to the preference channel grouping setting signal and the display demand signal; PIP (Picture-in-Picture) signal processing unit for processing a received signal to process the signal as a main screen and a sub-screen, respectively; a synthesizer for synthesizing output of the PIP signal processing unit and user guide information to output to display device; and a controlling unit for grouping preference channel according to the signal of the key input unit, and for allowing the preference channel to be displayed and concurrently allowing the user guide information of the GUI screen storage unit to be displayed.

When the preference channel grouping setting signal or the display demand signal is inputted, the controlling unit allows guide information for selecting group to store or display the received channel as the preference channel to be displayed, and allows the received channel to be displayed on the main screen and channels included in preset group to be sequentially displayed on the sub-screen for a certain period by performing the ON operation of PIP function.

Preferably, the guide information for selecting the group is such that the group that can be selected by the user is displayed, and when the user moves group using the group selection signal, the controlling unit allows channels set in the group that is moved whenever the group is moved to be sequentially displayed on the sub-screen for a certain period.

In addition, when the user selects the group in which the received channel is to be stored, the controlling unit allows the received channel to be displayed on the display device by storing the received channel in the selected group and performing the OFF operation of PIP function.

In order to achieve the object of the present invention, the third embodiment of the real time grouping apparatus according to the present invention comprises: a key input unit for processing preference channel grouping setting signal, display demand signal, and group selection signal through external input means; GUI screen storage unit for storing user guide information according to the preference channel grouping setting signal and the display demand signal; PIP signal processing unit for processing signals received by a main tuner and a plurality of sub-tuners to process the signals as a main screen and multi sub-screens, respectively; a synthesizer for synthesizing the main screen signal of the PIP signal processing unit and user guide information to output to display device; and a controlling unit for grouping preference channel according to the signal of the key input unit, and for allowing the preference channel to be displayed and at the same time allowing the user guide information of the GUI screen storage unit to be displayed.

When the preference channel grouping setting signal or the display demand signal is inputted, the controlling unit allows the received channel and guide information for selecting group to store or display the preference channel to be displayed on the main screen, and channels included in preset group to be displayed on the respective sub-screens by performing the ON operation of multi-PIP function.

Additionally, the guide information for selecting the group causes the group that can be selected by the user to be displayed, and when the user moves the group using the group selection signal, the controlling unit allows channels set in the group that is moved whenever the group is moved to be displayed on the respective sub-screens.

In order to achieve the object of the present invention, the first embodiment of the real time grouping method according to the present invention comprises the steps of: receiving channel; selecting channel grouping mode; displaying user guide information according to the channel grouping mode; selecting group in which the received channel is to be stored; sequentially displaying channels of the selected group for a certain period; and storing the received channel in group.

The user guide information is such that at least one group that can be selected by the user is displayed.

Additionally, the step of displaying the user guide information further comprises the step of sequentially displaying channels included in preset group for a certain period.

It is preferable that the storing step further comprises the step of storing the received channel in the selected group and displaying the received channel on display device.

On the other hand, the method further comprises the step of displaying channel group display mode, and the step of displaying comprises the steps of inputting channel group display key; displaying user guide information according to the display key input step; selecting group to be received; selecting channel to be received; and displaying selected channel so that the selected channel can be watched.

In order to achieve the object of the present invention, the second embodiment of the real time grouping method according to the present invention comprises the steps of: receiving channel; selecting channel grouping mode; displaying user guide information according to the channel grouping mode, and allowing the received channel to be displayed on the main screen and channels included in preset group to be sequentially displayed on the sub-screen for a certain period by performing the ON operation of PIP function; selecting a group in which the received channel is to be stored; sequentially displaying channel of the selected group on the sub-screen for a certain period; and storing the received channel in a group.

Preferably, the storing step further comprises the step of storing the received channel in the selected group and displaying on display device the received channel by performing the OFF operation of PIP function and the user guide information.

Additionally, the method further comprises the step of displaying channel group display mode, and the step of displaying comprises the steps of inputting channel group display key; displaying user guide information according to the display key input; selecting group to be received; selecting channel to be received; and displaying selected channel so that the selected channel can be watched.

It is preferable that the step of displaying the user guide information further comprises the step of sequentially displaying channels included in preset group on the sub-screen for a certain period.

In order to achieve the object of the present invention, the third embodiment of the real time grouping method according to the present invention comprises the steps of: receiving channel; selecting channel grouping mode; displaying user guide information according to the channel grouping mode, and allowing the received channel to be displayed on a main screen and channels included in preset group to be displayed on respective sub-screens by performing the ON operation of multi-PIP function; selecting a group in which the received channel is to be stored; displaying channel of the selected group on the respective sub-screens; and storing the received channel in a group.

On the other hand, the storing step further comprises the step of storing the received channel in the selected group and displaying on display device the received channel by performing the OFF operation of PIP function and the user guide information.

Additionally, the method further comprises the step of displaying channel group display mode, and the step of displaying comprises the steps of inputting channel group display key; displaying user guide information according to the display key input; selecting a group to be received; selecting a channel to be received; and displaying selected channel so that the selected channel can be watched.

The step of displaying the user guide information further comprises the step of sequentially displaying channels included in preset group on the multi-sub-screens for a certain period.

BRIEF DESCRIPTION OF THE DRAWINGS

The embodiments of the present invention will be explained with reference to the accompanying drawings, in which.

DETAILED DESCRIPTION OF THE INVENTION

The above objects, other objects, features and advantages of the present invention will be better understood from the following description taken in conjunction with the attached drawings.

Figure 1:
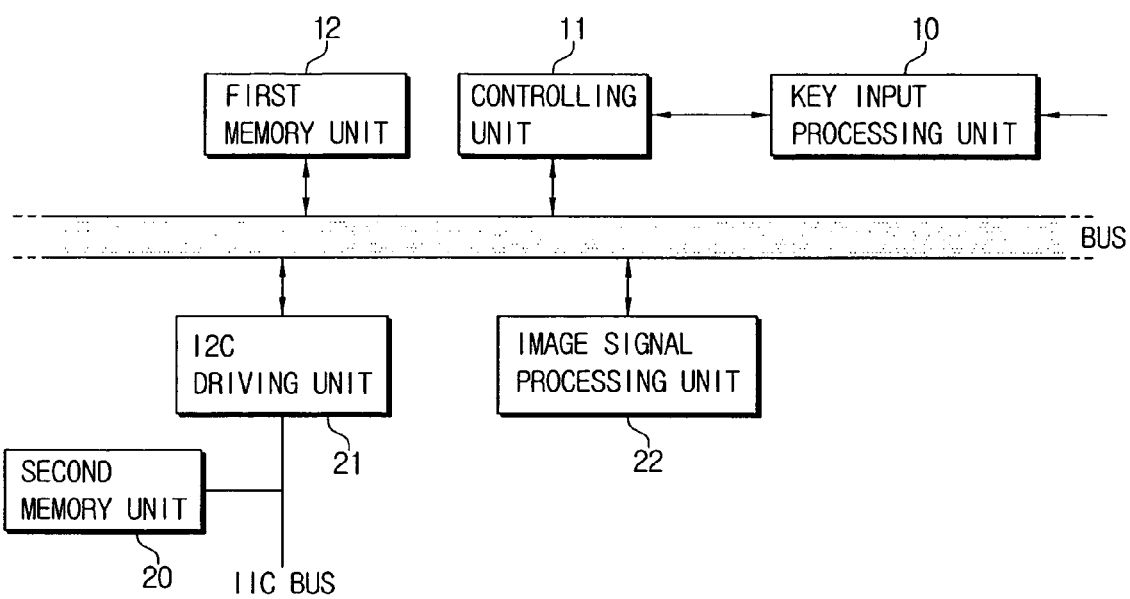
FIG. 1 is a block diagram showing the configuration of the related art digital television.
Figure 2A:
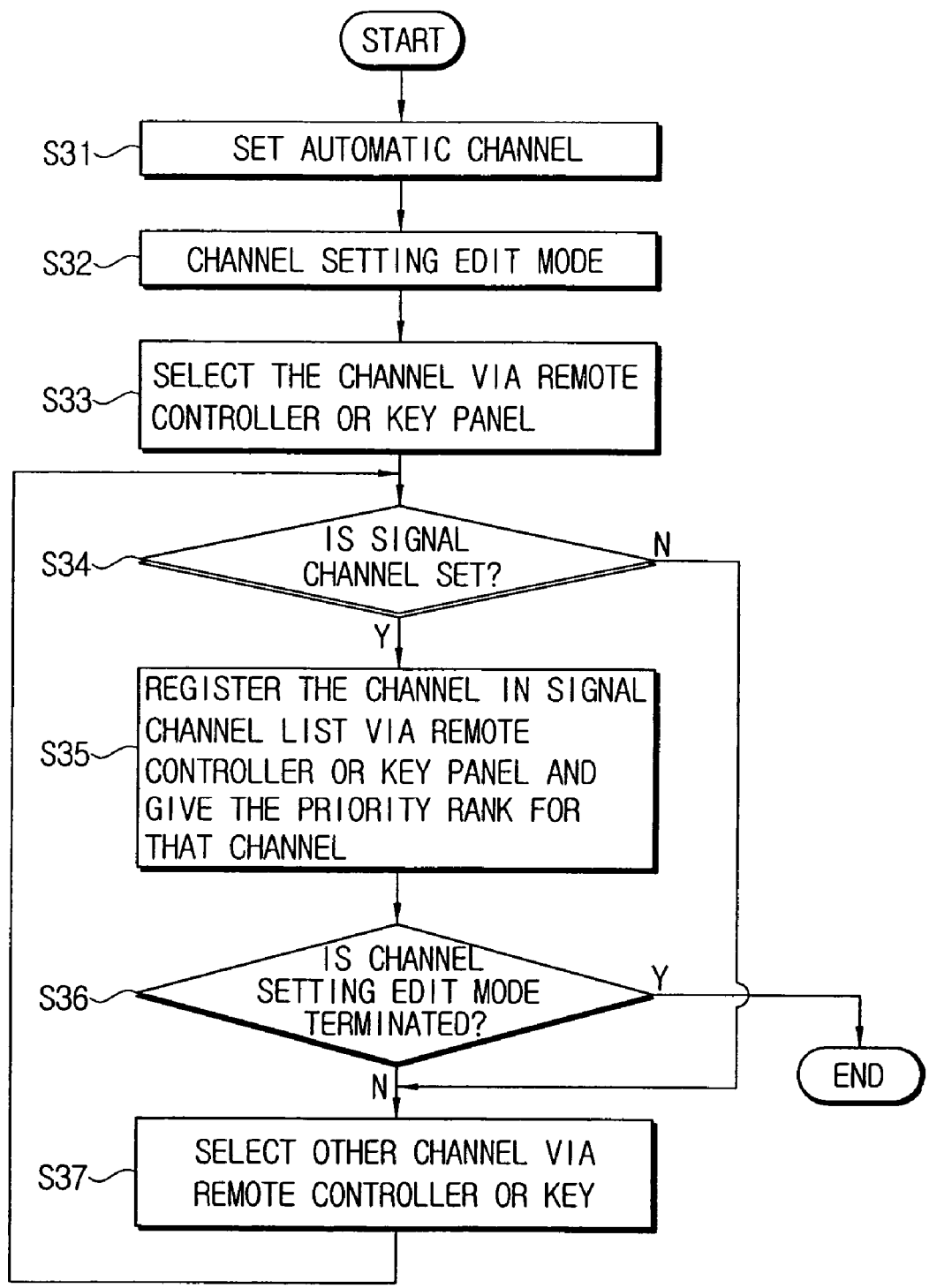
FIG. 2A is a flow chart showing a method giving the priority rank for the preference channel of the related art configuration shown in FIG. 1.
Figure 2B:
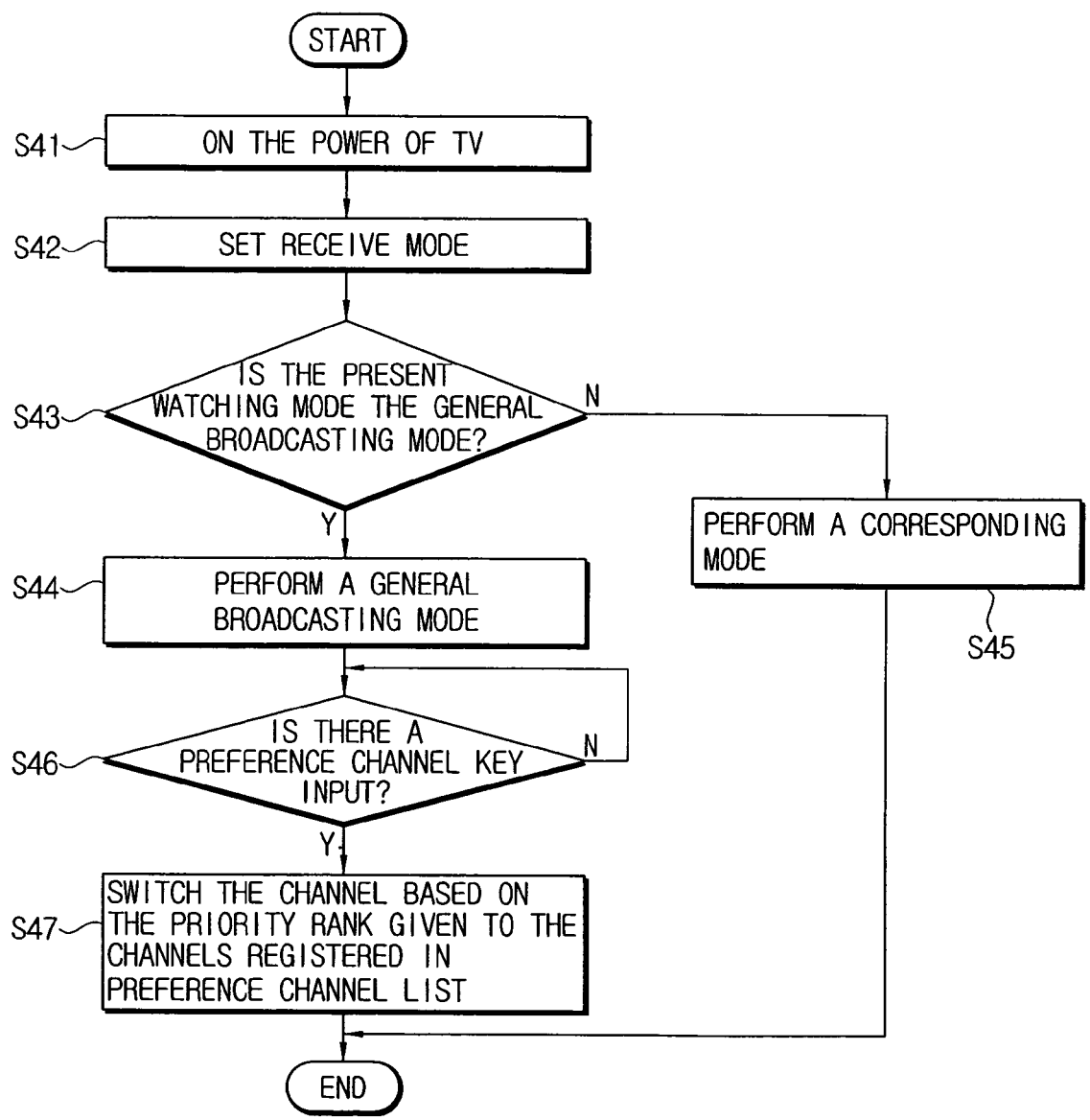
FIG. 2B is a flow chart displaying the preference channel of the related art configuration shown in FIG. 1.
Figure 3:
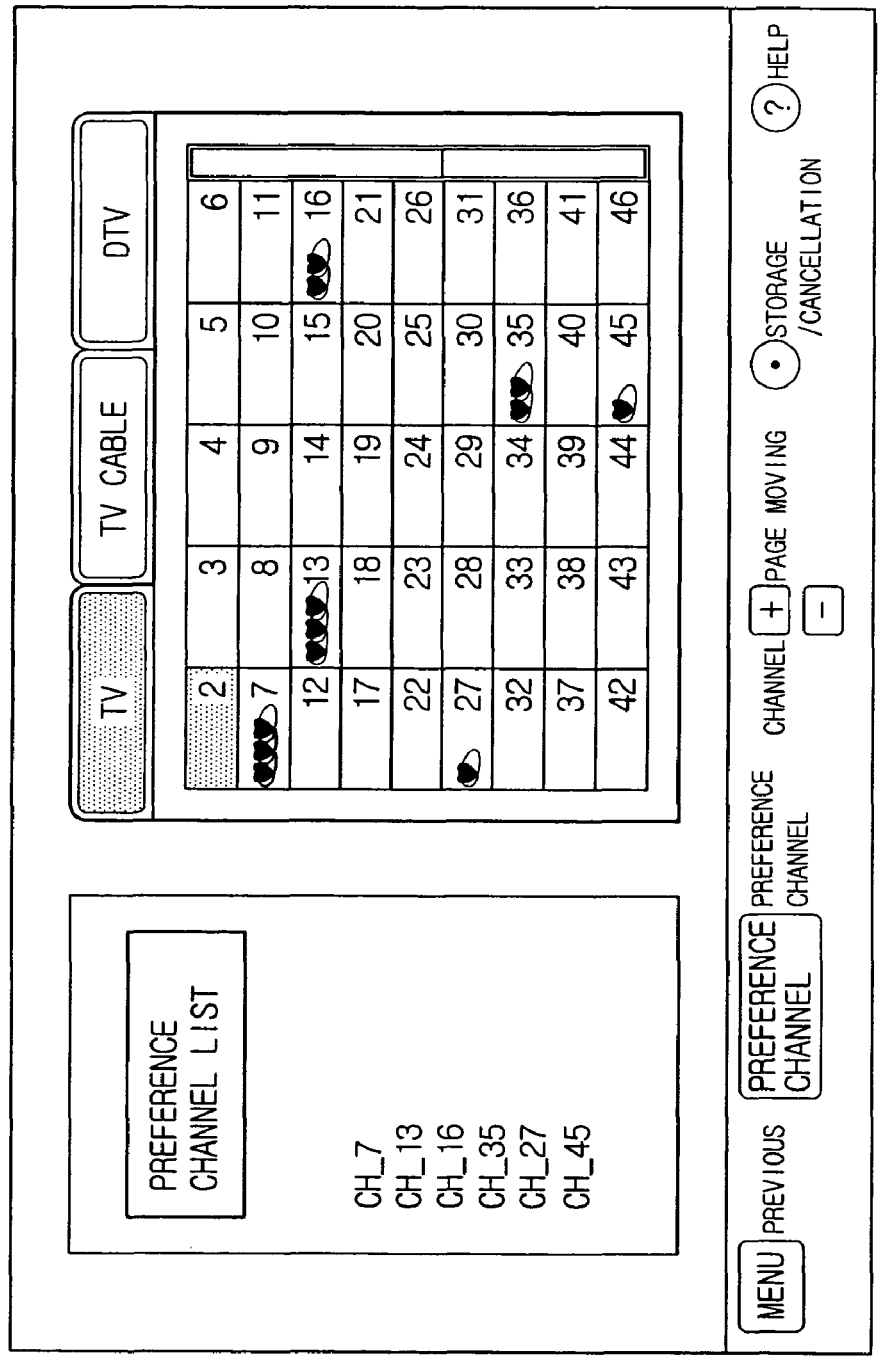
FIG. 3 is a view showing an embodiment listing the priority ranks for the preference channels of the related art configuration shown in FIG. 1.
Figure 4:
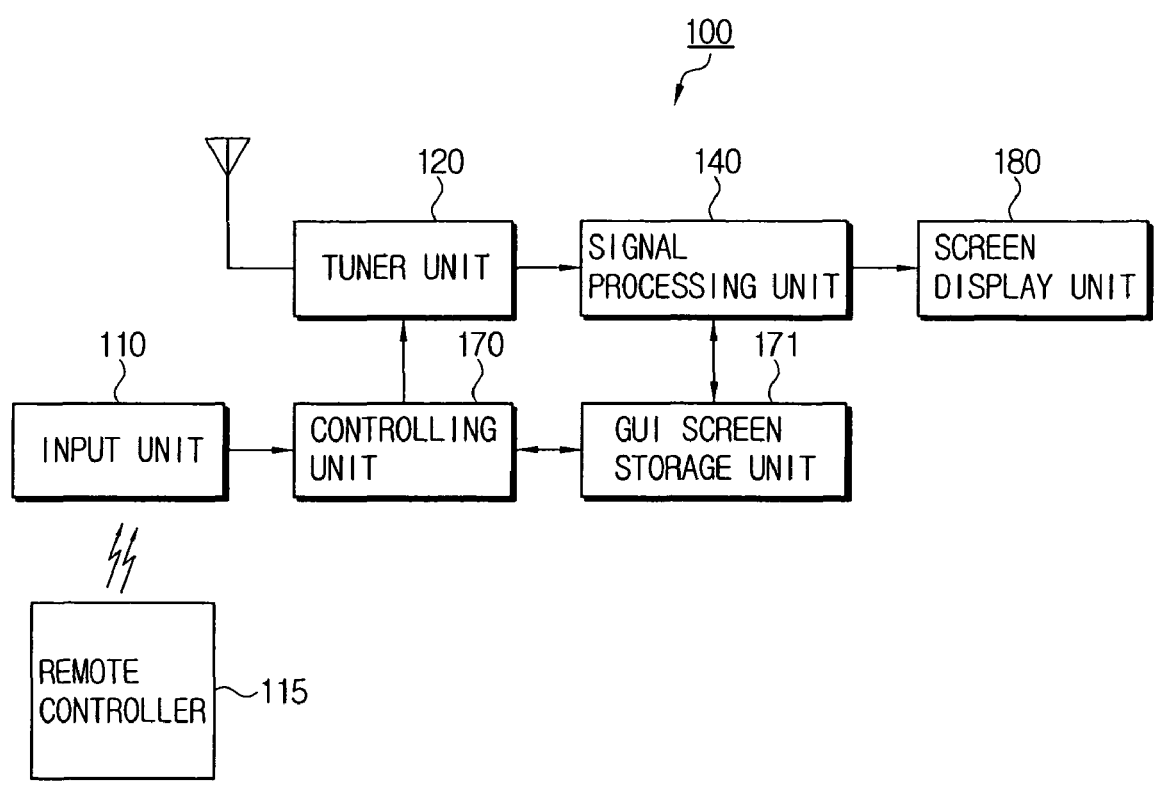
FIG. 4 is a block diagram showing the basic configuration of television having a real time channel grouping function according to a first embodiment of the present invention.

FIG. 4 is a block diagram showing a basic configuration of a television having a real time channel grouping function according to the first embodiment of the present invention.

As shown, the television 100 having a real time channel grouping function comprises an input unit 110, a remote controller 115, a tuner unit 120, a signal processing unit 140, a controlling unit 170, GUI screen 160, and a screen display unit 180.

The input unit 110 is provided on the body of the television and comprises a plurality of operation keys, including for example keys such as a channel group key, a group display key (not shown) for performing various operations. That is, the user's selection commands such as channel selection and volume adjustment are inputted by the plurality of operation keys of the input unit 110. Additionally, the user may input the selection commands using the remote controller 115 provided with the plurality of operation keys.

The tuner unit 120 selects the channel selected by the user and carries out the function of outputting a selected channel to the signal processing unit 140, after the television receives an ON signal.

The signal processing unit 140 processes a signal inputted from the tuner unit 120 and allows the processed signal to be displayed on the screen display unit 180. The screen display unit 180 may be comprised of a general display device. It will be understood that the display device may be a CRT display, a flat-screen apparatus, such as an LCD or plasma display, a rear or front projection display apparatus, or any other type of device capable of displaying audio-visual information, whether or not physically attached or connected to the television set or logically connected to the television.

The GUI screen storage unit 171 stores the GUI screen and performs the function of transferring the GUI screen to the signal processing unit 140 under the control of the controlling unit 170.

The controlling unit 170 controls the tuner unit 120 to select channels in response to the selection command of the user, and when the "channel group key" and "channel display key" associated with the present invention are inputted via the input unit 110 by the user, the controlling unit 170 fetches the necessary screen from the GUI screen storage unit 171 and allows the fetched screen to be displayed on the screen display unit 180.

Hereinafter, an operation of real time channel grouping according to a first embodiment of the present invention will be described with reference to FIGS. 4, 7A, 7B, and 12.

Figure 7A:
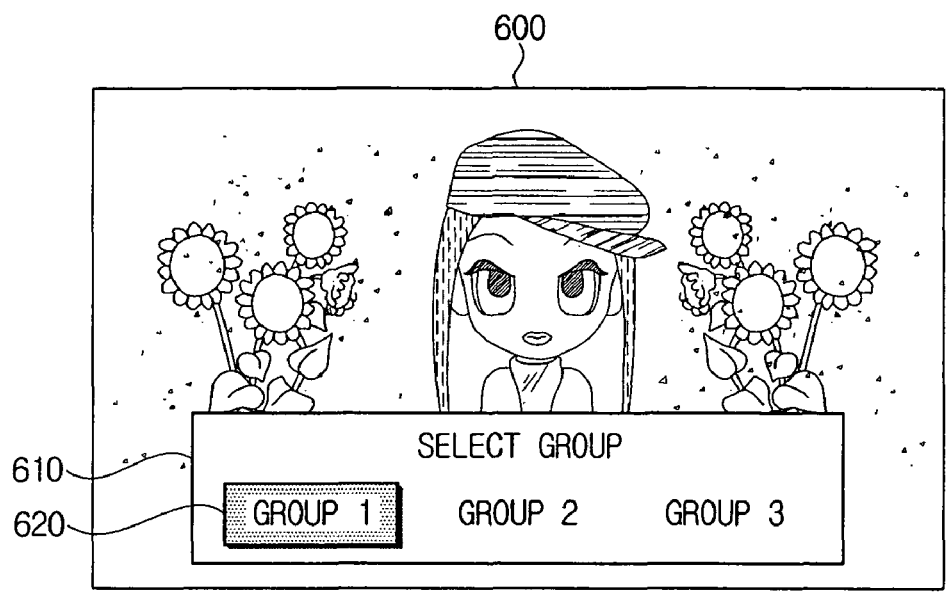
FIG. 7A is a view showing group selection screen using GUI in the broadcasting that is received.
Figure 7B:
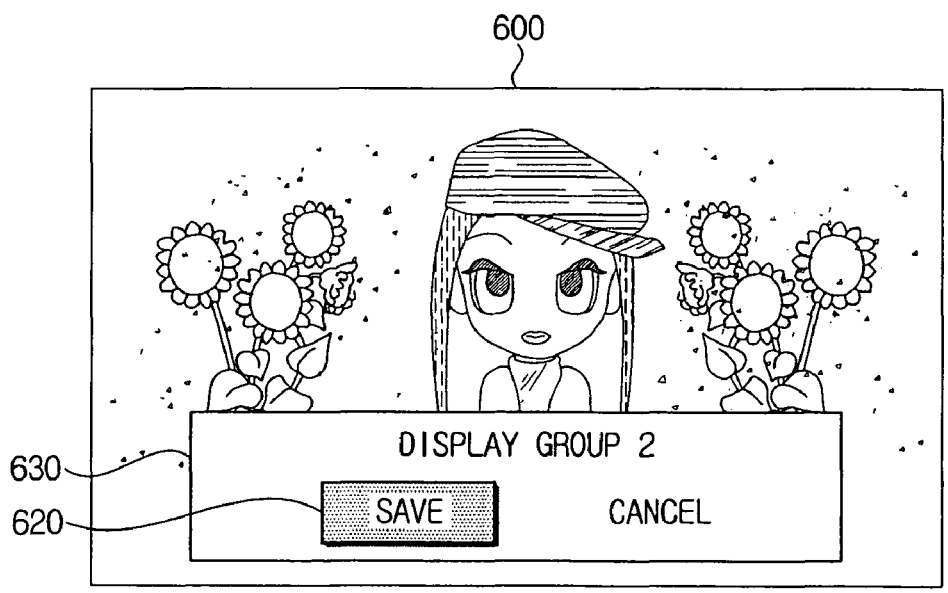
FIG. 7B is a view of a GUI screen that is displayed for storing a selected channel in a group.
Figure 12:
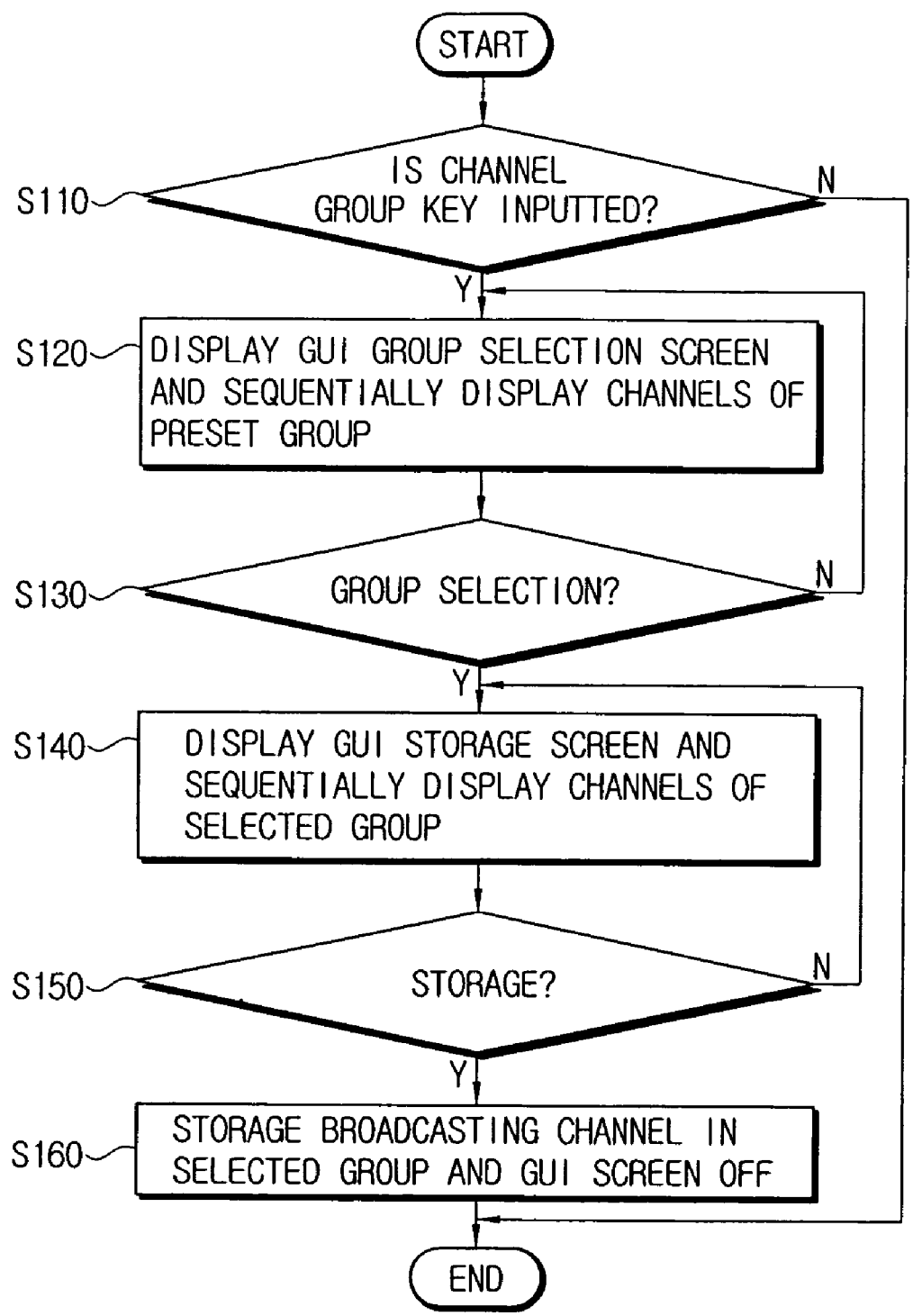
FIG. 12 is a flow chart explaining operations for grouping channels in real time according to the first embodiment of the present invention.

FIG. 7A is a view showing a group selection screen using GUI information displayed on the broadcasting that is received, FIG. 7B is a view of GUI screen that is displayed for storing a selected channel in a group, and FIG. 12 is a flow chart explaining operations for grouping channels in real time according to the first embodiment of the present invention. As shown, when the user inputs the "channel group key" via the remote controller 115 and the input unit 110 for grouping a preference channel into a specific group while watching the broadcasting 600 through the screen display unit 180 (step S110), the controlling unit 170 allows GUI screen 610 for selecting the group as shown in FIG. 7A from the GUI screen storage unit 171 to be displayed on the screen display unit 180. Additionally, the controlling unit 170 controls the tuner unit 120 to allow the channels included in preset group, "Group1", to be sequentially displayed for a certain period (step S120). For example, in the present embodiment, there are three selectable groups. The user selects and stores Group 2; channels 5, 6, and 7 are set in "Group 1," and channels 1, 2, and 3 are stored in "Group 2." Additionally, in the initial group selection screen display, a selection bar 620 is displayed on the preset group, "Group 1" and a desired group may be selected by shifting the selection window 620 using left and right selection keys (not shown). Accordingly, the channels 5, 6, and 7 being set in the preset group are supposed to be sequentially displayed on the screen display unit 180 until the user selects the group. If the user does not select the group, the process iteratively performs the procedures beginning with the step S120. If the user selects "Group 2" using the left and right selection keys (not shown) (the step S130), the controlling unit 170 displays another GUI screen 630 determining whether the channel displayed for the selected group as shown in FIG. 7B is stored, and sequentially displays the channels corresponding to the selected "Group 2" for a certain period (the step S140). If the user wishes to store the received channel in the selected group (the step S150), the controlling unit 170 stores the channel that is received in the selection group (Group 2), performs the OFF operation of its associated GUI screen 610 (the step S160), and thereby the process ends. In the step S150, if the user wishes not to store the received channel in the selected group, the process iteratively performs the step S140. If no "channel group key" is inputted in the step S110, the process ends.

Additionally, in a preferred embodiment, a "save" "soft-button" indicating storage is displayed, and "cancel" "soft-button" indicating cancellation of the GUI screen 630, so that the user can select and control the process. In a preferred embodiment, in the initial display, the selection bar 620 is displayed corresponding to "save" (indicating storage as the option).

Figure 10:
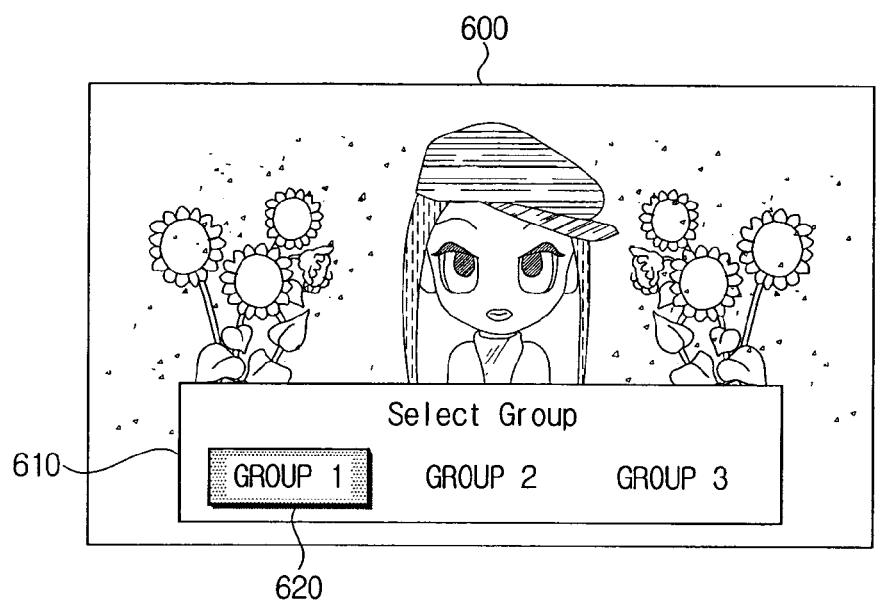
FIG. 10 is a view showing group display screen using GUI in the broadcasting that is received.
Figure 11A:
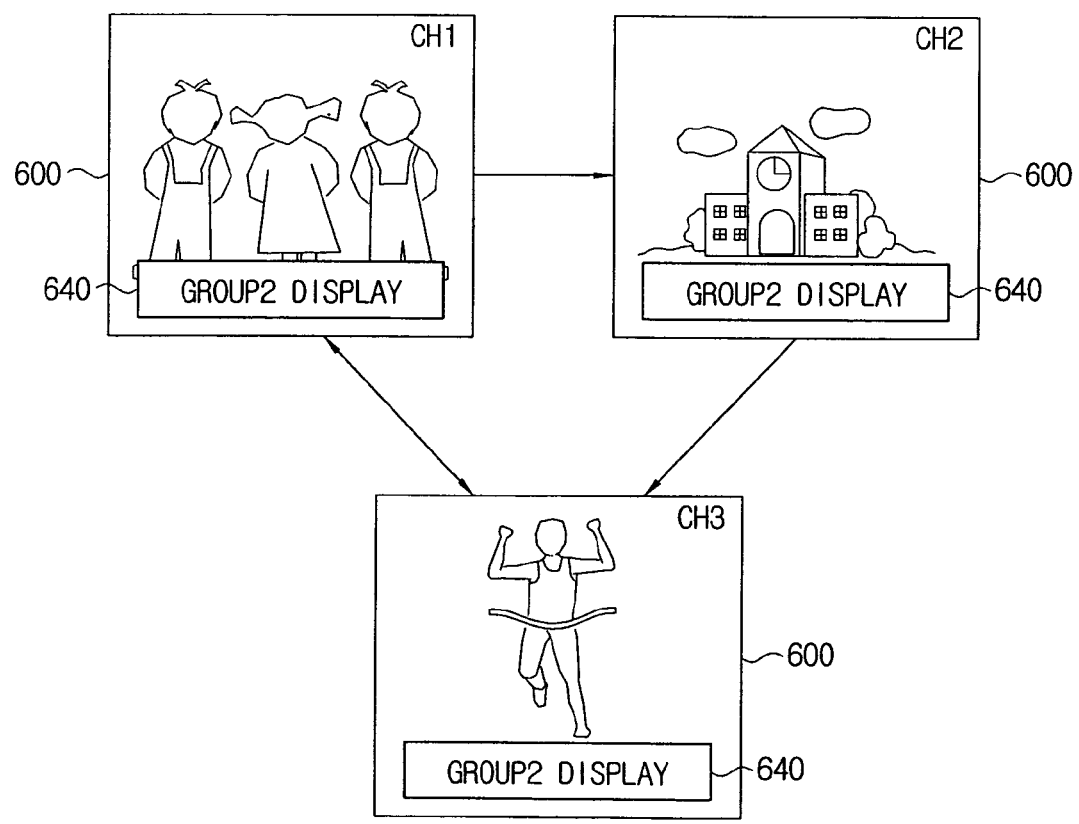
FIG. 11A is a view sequentially showing channels belonging to a selected group.
Figure 13:
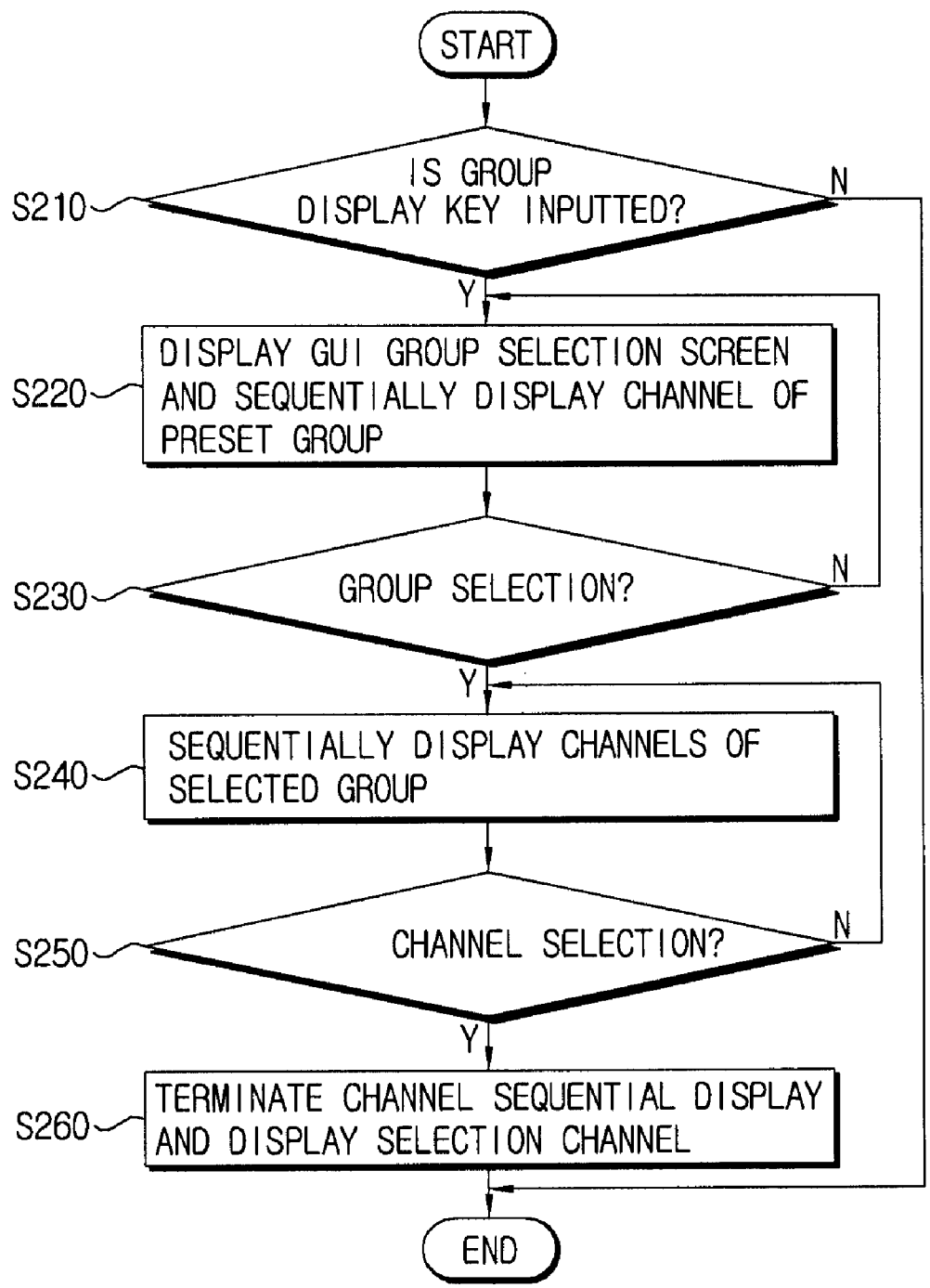
FIG. 13 is a flow chart showing procedures for selecting channels using group display key by user.

Hereinafter, in the case where the user establishes each group by iteratively performing the operations above, the description will be made of a method in which the channels stored in the each group are displayed on the screen. FIG. 10 is a view showing a group display screen using GUI shown on the broadcasting that is received, FIG. 11A is a view sequentially showing channels belonging to a selected group, and FIG. 13 is a flow chart showing procedures for selecting channels using a group display key by a user. As shown, if the user inputs the "group display key" of the remote controller 115 or the input unit 110 while watching the broadcasting 600 through the screen display unit 180 (step S210), the controlling unit 170 allows GUI screen 610 for selecting the group stored in the GUI screen storage unit 171 to be displayed on the screen display unit 180. Additionally, the controlling unit 170 controls the tuner unit 120 for allowing the channel included in preset group, "Group1", to be sequentially displayed for a certain period.

If the user does not select the group, the process iteratively performs the step S220. If the user selects the group, for example using the left and right selection keys (not shown) of the remote controller 115 or the input unit 110 (the step S230), the controlling unit 170 controls the tuner unit 120 to enable the channels being set in the selected group of preference channels to be sequentially displayed (step S240). For example, in the present embodiment, a case in which three groups are selectable, a selection window 620 is displayed for the preset group, "Group 1," in the initial group selection screen display, and the user in this instance selects Group 2 using the left and right selection keys (not shown). As shown in FIG. 11A, if the user selects "Group 2", the controlling unit 170 controls the tuner unit 120 so that initially "channel 1" is received for a certain period, then "channel 2" is received for the certain period, and then the final channel, "channel 3" is received for the certain period again in series, and the process iteratively performs the operations above until the user selects a specific channel. Additionally, if the channels are received in series as shown in FIG. 11A, in order to inform the user of the information that the channel belonging to the group, "Group 2", selected by the user, is being displayed, in a preferred embodiment the group number information is displayed using GUI screen 640.

If the user does not select a specific channel during the sequential display of the channels, the process iteratively performs the step S240. If the user does select a specific channel (yes at the step S250), the controlling unit 170 stops the sequential display of the channels and controls the tuner unit 120 and the signal processing unit 140 so that the selected channel can be received (the step S260), and thereby the process ends. Additionally, the controlling unit 170 performs the OFF processing for the GUI screen 640 being displayed. Thus, if no is selected at the "group display key" in step S210, the process ends.

Hereinafter, the second embodiment for achieving the object of the present invention will be described.

Figure 5:
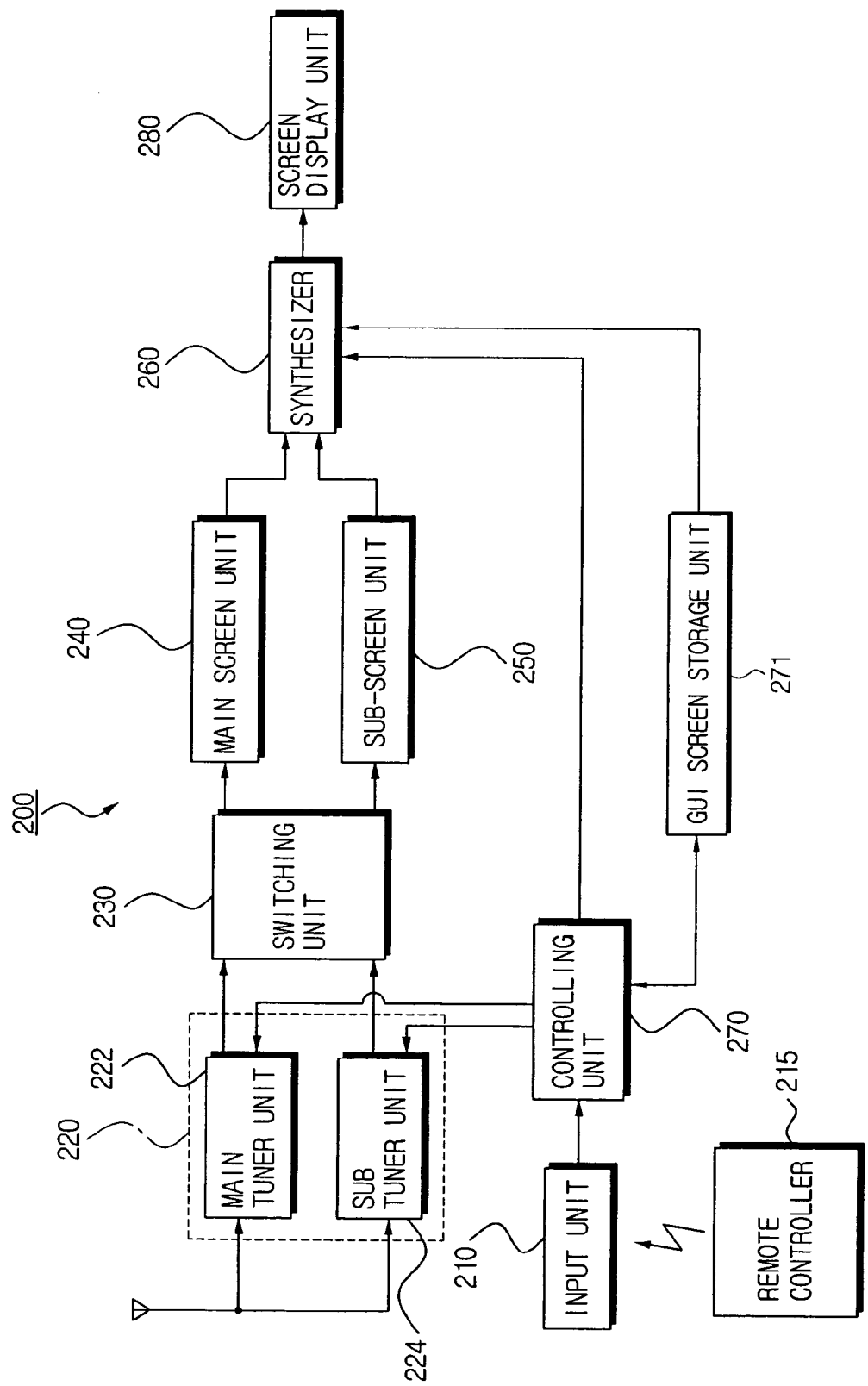
FIG. 5 is a block diagram showing the configuration of real time channel grouping television having one PIP function according to a second embodiment of the present invention.

FIG. 5 is a block diagram showing the configuration of real time channel grouping television having one PIP function according to the second embodiment of the present invention.

As shown, the television 200 comprises an input unit 210, a tuner unit 220, a switching unit 230, a main screen unit 240, a sub-screen unit 250, a synthesizer 260, a controlling unit 270, GUI screen storage unit 271, and a screen display unit 280.

Since the configurations of the GUI screen storage unit 271 and the screen display unit 280 of the present embodiment are identical to those of the GUI screen storage unit 171 and the screen display unit 180 of the first embodiment, the explanation on thereof will be omitted.

The input unit 210 is provided on the body of the television and comprises a plurality of operation keys, including for example channel group key, group display key, and the like (not shown), for performing various operations of the television. In particular, the user's selection commands such as channel selection, PIP function, and volume adjustment are inputted through the plurality of operation keys of the input unit 210. Generally, the user may input the selection commands using the remote controller 215 provided with the plurality of operation keys.

The tuner unit 220 includes a main tuner unit 222 and a sub-tuner unit 224. Generally, when the television receives an ON signal, the main tuner unit 222 selects the channel that is preset or selected by the user. When the PIP function is executed, the sub-tuner unit 224 selects a corresponding sub-screen channel under the control of the controlling unit 270.

When the user executes the PIP function by selecting the PIP function key provided on the input unit 210 and the remote controller 215, the switching unit 230 switches the signal for the channel selected by the main tuner unit 222 and the sub-tuner unit 224 to provide the switched signal to the main screen unit 240 and the sub-screen unit 250. The main screen unit 240 processes image signal of the broadcasting signals of the channel selected by the main tuner unit 222 so that the image signal is suitable to the main screen size, and outputs the processed signal as a main screen signal. Additionally, the sub-screen unit 250 processes the image signal of the broadcasting signals of the channel selected by the sub-tuner unit 224 so that the image signal is suitable to the sub-screen size, and outputs the processed signal as a sub-screen signal. In addition, if the "channel group key" or "group display key" is activated, the sub-screen unit 250 receives the sub-screen image signal for a certain period and outputs the same so that the channels belonging to the selected group are sequentially displayed on the sub-screen.

The synthesizer 260 synthesizes the image signal of the main screen and the image signal of the sub-screen so that the main screen and the sub-screen can be displayed by the screen display unit 280, to output the synthesized image signal. That is, the synthesizer 260 is to cause the main screen and the sub-screen to be displayed, the sub-screen being displayed on a predetermined region of the main screen.

The controlling unit 270 controls the tuner unit 220 to select the channel in response to the selection commands of the user. In other words, when the "channel group key" or "channel display key" is inputted via the input unit 210 by the user, the controlling unit 270 fetches the necessary GUI screen from the GUI screen storage unit 271 and controls the synthesizer 260 to display the GUI screen on the screen display unit 280. Additionally, the controlling unit 270 controls the main tuner unit 222 so that the broadcasting that is received can be displayed as a main screen by executing the ON operation of PIP screen, and controls the sub-tuner unit 224 so that the channels of the selected group can be sequentially received in the sub-screen for a certain period.

Hereinafter, the operation of real time channel grouping according to the second embodiment of the present invention will be described with reference to FIGS. 5, 8A, 8B, and 14

Figure 8A:
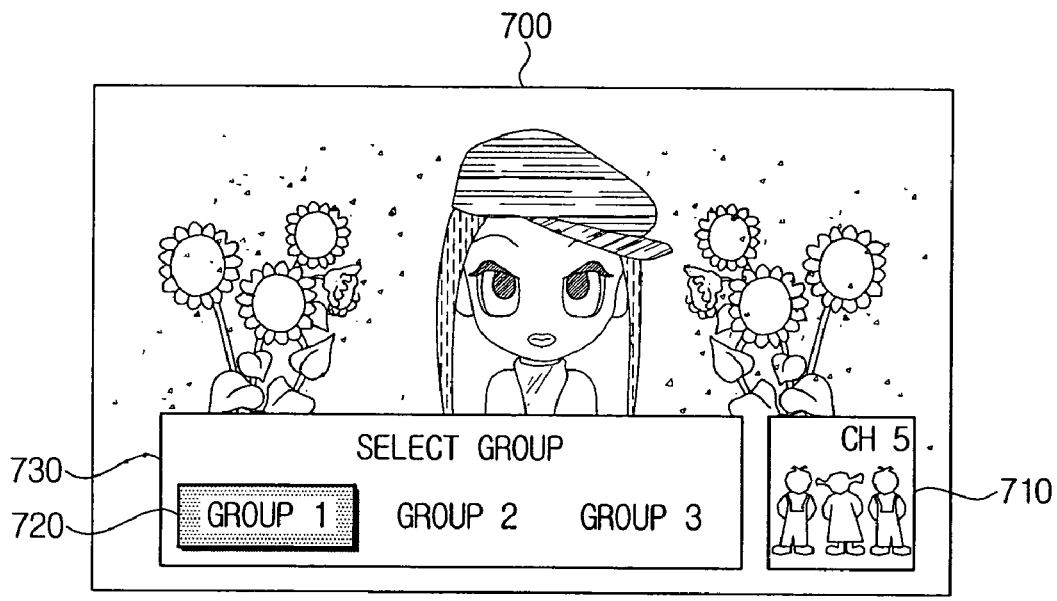
FIG. 8A is a view showing a PIP screen and group selection screen using GUI in the broadcasting that is received.
Figure 8B:
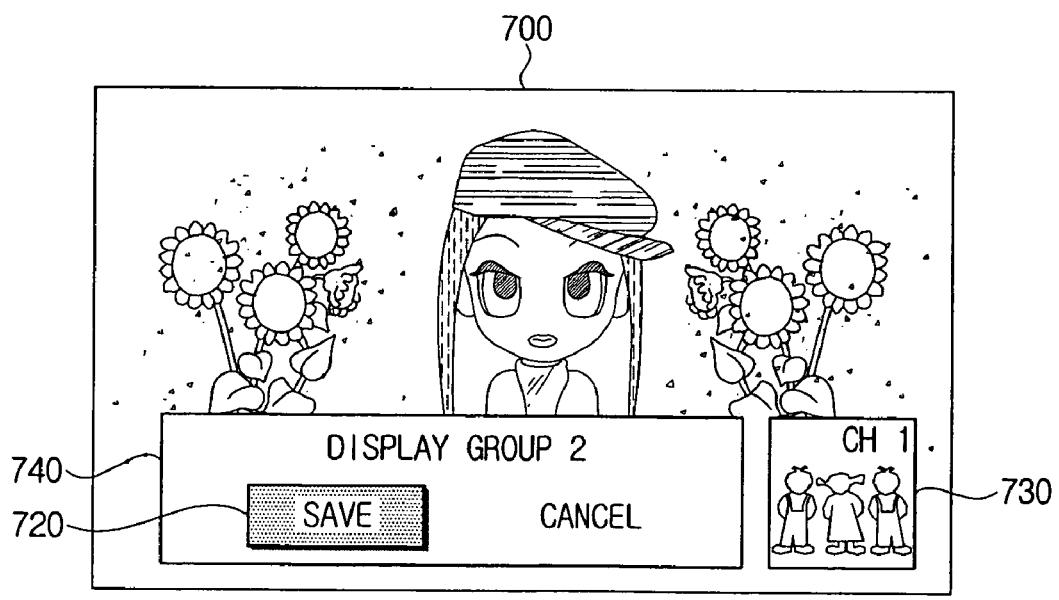
FIG. 8B is a view of a GUI screen that is displayed for storing a selected channel in a group.
Figure 14:
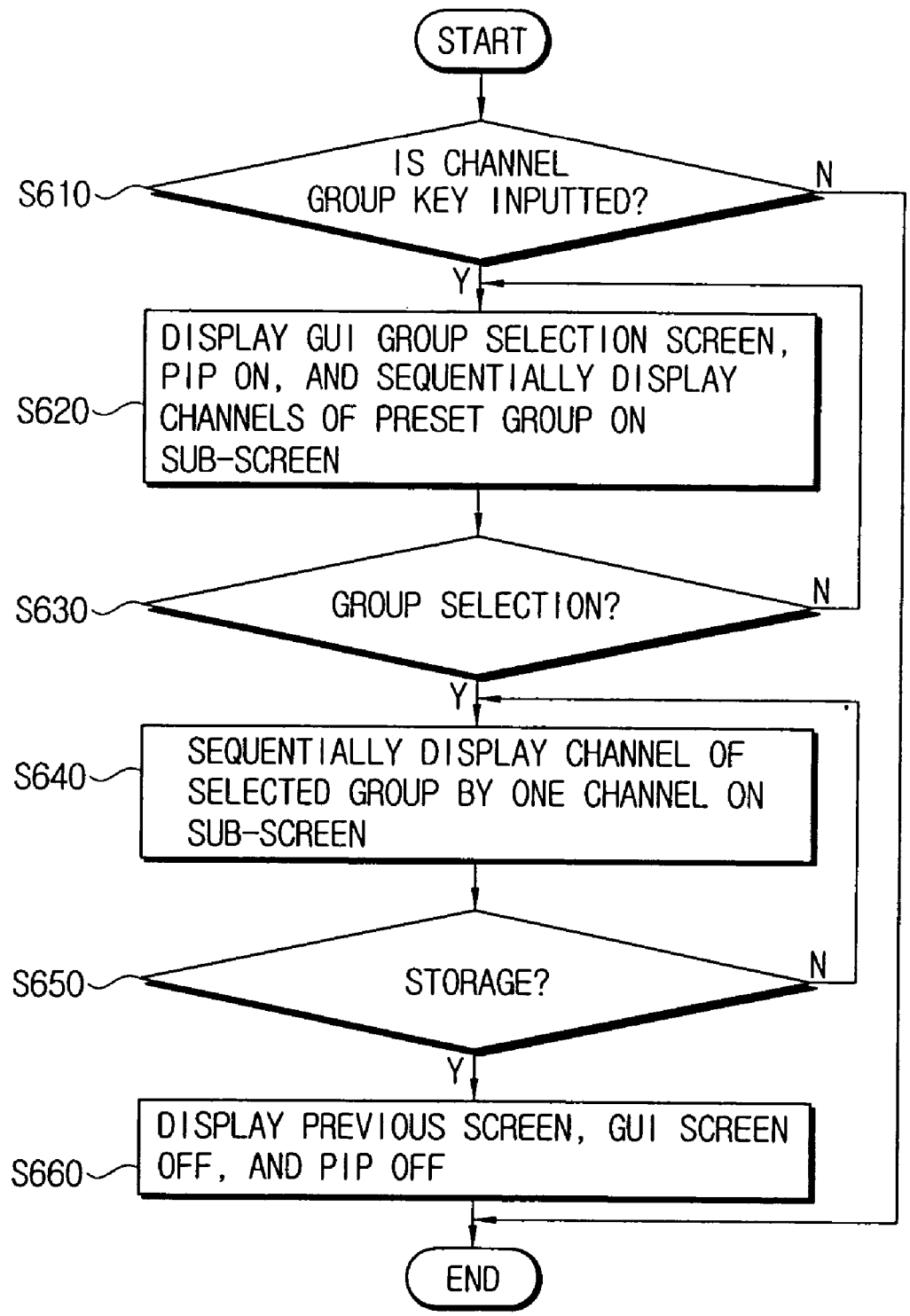
FIG. 14 is a flow chart explaining operations for grouping channels in real time according to the second embodiment of the present invention.

FIG. 8A is a view showing PIP screen 710 and group selection screen 730 using GUI in the broadcasting that is received, FIG. 8B is a view of GUI screen 740 that is displayed for storing a selected channel in a group, and FIG. 14 is a flow chart explaining the operations for grouping channels in real time according to the second embodiment of the present invention.

As shown, when the user inputs the "channel group key" of the remote controller 215 and the input unit 210 for grouping his preference channel into a specific group while watching the broadcasting 700 using the main tuner unit 222 (the step S610), the controlling unit 270 allows GUI screen 730 for selecting a group as shown in FIG. 8A from the GUI screen storage unit 271 to be displayed on a predetermined region of the screen display unit 280 superposed on the channel that is received. At the same time, the controlling unit 270 executes the ON operation of the PIP function and controls the sub-tuner unit 224 to allow the channels included in a preset group, "Group1", to be sequentially displayed on the sub-screen 710 for a certain period (the step S620). That is, the controlling unit 270 causes the channels 5, 6, and 7 stored in "Group 1" to be sequentially displayed. Additionally, even when the user has been watching the PIP screen, when the "channel group key" is inputted, it is desirable to perform the same operation. For example, in the present embodiment, when three groups are selectable, the user may select Group 2, with channels 1, 2, and 3 set in "Group 2". Additionally, in the initial group selection screen display, a selection bar 720 is displayed on the preset group, "Group 1" and a desired group may be selected using the left and right selection keys (not shown). Accordingly, the "channel 5" being stored in "Group 1" is displayed on the sub-screen 710 first until the user selects the group (see FIG. 8A).

If the user does not select a group, the process iteratively performs the procedures of the step S620. If the user selects "Group 2" using the left and right selection keys (not shown) (the step S630), the controlling unit 270 displays another GUI screen 740 inquiring whether the channel that is currently received on the main screen is to be stored in Group 2, while sequentially displaying the channels of the selected group as shown in FIG. 8B on the sub-screen 730 for a certain period (channels 1, 2, and 3 being sequentially and iteratively displayed) (the step S640). If the user wishes to store the received main channel in the selected group using the selection window 720 (the step S650), the controlling unit 270 stores the main channel that is received in the selection group (Group 2) and performs the OFF operation of the associated GUI screen 740 and PIP screen (the step S660), and thereby the process ends. In the step S650, if the user does not wish to store the received channel in the selected group, the process iteratively performs the step S640. If the "channel group key" is not inputted in the step S610, the process ends.

Hereinafter, in the case where the user establishes each group by iteratively performing the operations above, the description will be made of displaying the channels stored in each group on the screen.

Figure 11B:
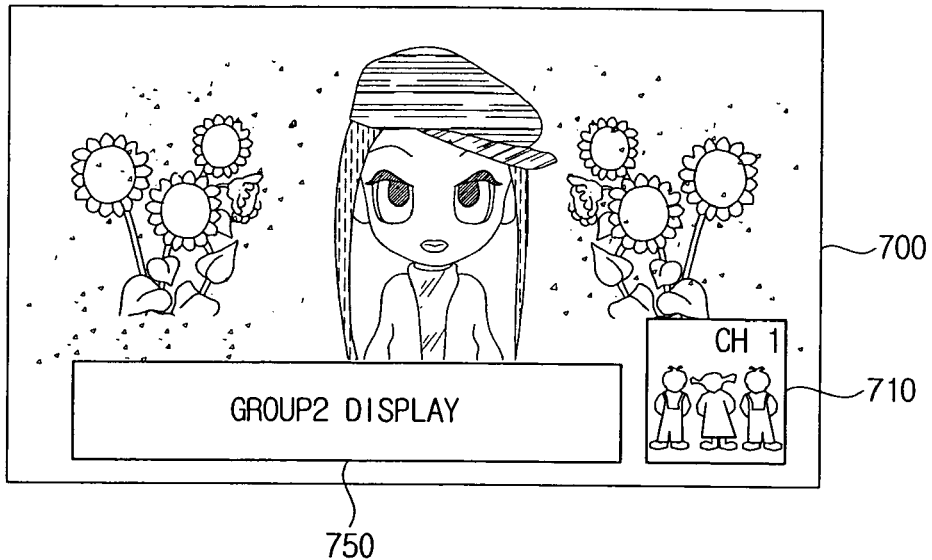
FIG. 11B is a view of a PIP showing group display screen using GUI in the broadcasting that is received.
Figure 15:
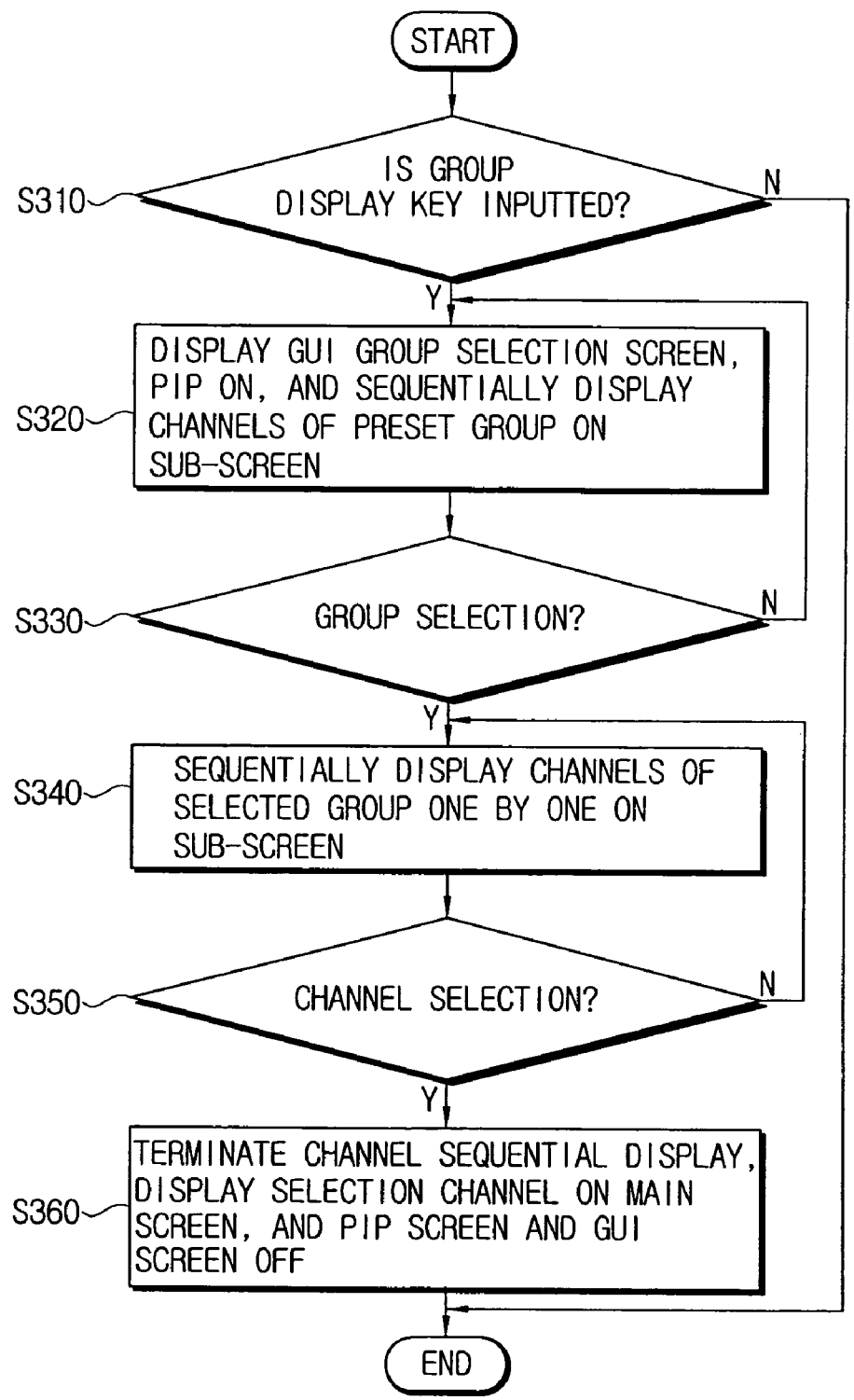
FIG. 15 is a flow chart showing procedures for selecting channels using group display key by user.

FIG. 11B is a view showing a GUI group display screen transposed on the broadcasting that is received, and FIG. 15 is a flow chart showing procedures for selecting the preference channels using the "group display key". As shown, if the user inputs the "group display key" of the remote controller 215 or the input unit 210 for grouping the preference channel into a specific group while watching the broadcasting 700 through the screen display unit 280 (the step S310), the controlling unit 270 allows the screen (FIG. 8A) for selecting a group stored in the GUI screen storage unit 271 to be displayed on the screen display unit 280. Additionally, the controlling unit 270 performs the ON operation of the PIP screen and concurrently allows "channel 1" included in preset group (in the present embodiment, "Group1") to be displayed on the sub-screen 710 (the step S320).

If the user does not selects the group to be watched, the process iteratively performs the step S320. If the user selects the group using the left and right selection keys (not shown) of the remote controller 215 or the input unit 210 (the step S330), as shown in FIG. 11B, the controlling unit 270 controls the sub-tuner unit 224 to allow the channels being set in the selected group to be sequentially displayed on the sub-screen 710 and to allow GUI screen 750 indicating that the channel that is currently selected is Group 2 to be displayed on the screen display unit 280 (the step S340).

For example, in the present embodiment, in the case in which there are three groups selectable, a selection window 750 is displayed for the preset group, "Group 1," in the initial group selection screen display, and the user may select Group 2, for example using left and right selection keys (not shown). Additionally, in the present embodiment, for example, assume that the channels 1, 2, and 3, i.e., three channels, are set in "Group 2". As shown in FIG. 11B, the user selects "Group 2", the controlling unit 270 controls the tuner unit 220 so that initially "channel 1" is received for a certain period, "channel 2" is received since the certain period, and finally channel 3 is received for the certain period in series. The above-described process is iteratively performed until the user selects a specific channel.

If the user does not select a specific channel during the sequential display of the channels on the sub-screen 710, the process iteratively performs the step S340. If the user selects the specific channel (the step S350), the controlling unit 270 stops the sequential display of the channels and performs the OFF operation of PIP screen and GUI screen so that the selected channel can be displayed on the main screen (the step S360), thereby the process ends. Then, if the "group display key" in step S310 is not selected, the process ends.

Hereinafter, the third embodiment for achieving the object of the present invention will be described.

Figure 6:
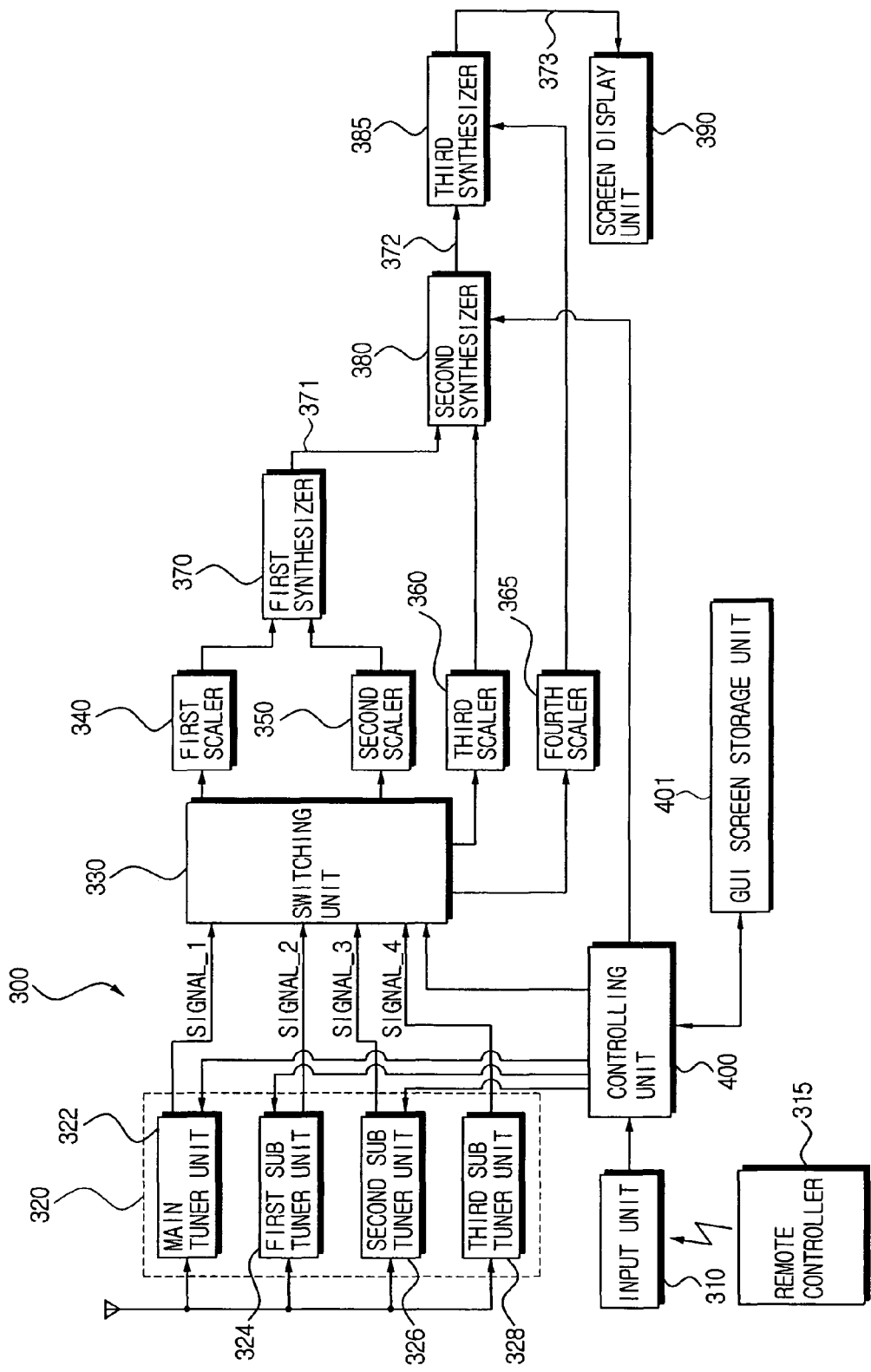
FIG. 6 is a block diagram showing the basic configuration of a television having a multi-PIP function according to a third embodiment of the present invention.

FIG. 6 is a block diagram showing the basic configuration of television having multi-PIP function according to the third embodiment of the present invention.

As shown, the television 300 having the multi-PIP function according to the present invention comprises an input unit 310, a tuner unit 320, a switching unit 330, a first scaler 340, a second scaler 350, a third scaler 360, a fourth scalar 365, a first synthesizer 370, a second synthesizer 380, a third synthesizer 385, a controlling unit 400, GUI screen storage unit 401, and a screen display unit 390.

Since the configurations of the GUI screen storage unit 401 and the screen display unit 390 of the present embodiment are identical to those of the previous embodiments of the present invention, their detailed explanation will be omitted.

The input unit 310 is provided on the body of the television and comprises a plurality of operation keys, including for example channel group key, group display key, and the like (not shown), for performing various operations of the television. That is, the user's selection commands such as channel selection and volume adjustment are inputted through the plurality of operation keys of the input unit 310. Generally, the user may input the selection commands using the remote controller 315 provided with the plurality of operation keys from the remote location.

In the television having the multi-PIP function, it is a matter of course that the input unit 310 and the remote controller 315 are provided with a predetermined function key for the PIP function and a function key for channel search. Alternatively, separate function keys may be provided, instead of a plurality of keys provided with various other functions.

The tuner unit 320 includes a main tuner unit 322 and at least three sub-tuner units 324, 326, and 328. Generally, when an ON signal is transmitted, the main tuner unit 322 selects the channel that is preset. Additionally, when the television is inputted with the channel selection command to be implemented in the main screen by the user, the main tuner unit 322 selects the channel corresponding to the command. When the PIP function is executed, the sub-tuner units 324, 326, and 328 select a corresponding channel under the control of the controlling unit 400. The number of the sub-tuner units 324, 326, and 328 may be n, wherein n is defined as a positive integer.

For example, in order to receive four different RF broadcasting signals and to implement the signals on the screen, one main tuner unit 322 and at least three sub-tuner units 324, 326, and 328 should be provided.

For example, in the present embodiment, a case in which one main tuner unit 322 and at least three sub-tuner units 324, 326, and 328 are provided to select different image signals is considered. The image signal of the channel selected by the main tuner unit 322 is outputted as a first image signal (signal_1), the image signal of the channel selected by the first sub-tuner unit 324 is outputted as a second image signal (signal_2), the image signal of the channel selected by the second sub-tuner unit 326 is outputted as a third image signal (signal_3), and the image signal of the channel selected by the third sub-tuner unit 328 is outputted as a fourth image signal (signal_4).

When the user executes the PIP function by selecting the multi-PIP function key provided on the input unit 310 and the remote controller 315, the switching unit 330 switches the first image signal (signal_1), the second image signal (signal_2), the third image signal (signal_3), and the fourth image signal (signal_4) for the channels selected by the main tuner unit 322, the first sub-tuner unit 324, the second sub-tuner unit 326, and the third sub-tuner unit 328 to provide the switched signals to the first scaler 340, the second scalar 350, the third scaler 360, and the fourth scaler 365, respectively. In addition, if the user inputs the "channel group key" or "group display key", the switching unit 330 allows the channel being set in the selected group to be received via each of the sub-tuner units.

In response to the screen selection command, the switching unit 330 may selectively supply each of the first image signal (signal_1), the second image signal (signal_2), the third image signal (signal_3), and the fourth image signal (signal_4) to any of the first scaler 340, the second scaler 350, the third scaler 360, and the fourth scaler 365. Additionally, the switching unit 330 may change, based on the user's screen change command, the supply path of each of the first image signal (signal_1), the second image signal (signal_2), the third image signal (signal_3), and the fourth image signal (signal_4) that is supplied to the first scaler 340, the second scaler 350, the third scaler 360, and the fourth scaler 365, respectively.

Specifically, when the user's screen change command is inputted, the switching unit 330 supplies the first image signal (signal_1) that is inputted to the first scaler 340 to the second scaler 350, the second image signal (signal_2) that is inputted to the second scaler 350 to the third scaler 360, the third image signal (signal_3) that is inputted to the third scaler 360 to the fourth scaler 365, and the fourth image signal (signal_4) that is inputted to the fourth scaler 365 to the first scaler 340. In other words, the image that is implemented in a first main screen 600, a first sub-screen 860, a second sub-screen 850, and a third sub-screen 840 may be changed within a plurality of image signals (signal_1, signal_2, signal_3) that are inputted by the user's screen change command.

The first scaler 340 scales the first image signal (signal_1) of the channel selected by the main tuner unit 322 to conform in size to the first main screen and outputs the scaled first image signal. The second scaler 350 scales the second image signal (signal_2) of the channel selected by the first sub-tuner unit 324 to conform in size to the first sub-screen and outputs the scaled second image signal. The first synthesizer 370 synthesizes the first main screen and the first sub-screen so that the first main screen and the first sub-screen can be displayed on the screen display unit 390, thereby generating a first screen 371.

The third image signal (signal_3) from the switching unit 330 to the third scaler 360 is scaled to conform in size to the second sub-screen in the third scaler 360. That is, the third scaler 360 scales the third image signal (signal_3) of the channel selected by the second sub-tuner unit 324 to conform in size to the second sub-screen and outputs the scaled third image signal.

The second synthesizer 380 synthesizes the first screen output at 371 and the second sub-screen that is outputted from the third scaler 360, thereby generating a second screen output at 372. The second screen is comprised of the first screen and the second sub-screen, and in turn the first screen is comprised of the first main screen and the first sub-screen.

That is, the second screen is comprised of one main screen and two sub-screens. At this time, the first screen 371 operates like the main screen, and the second sub-screen operates like the sub-screen.

The fourth image signal (signal_4) from the switching unit 330 to the fourth scaler 365 is scaled to conform to the third sub-screen size in the fourth scaler 365.

The third synthesizer 385 synthesizes the second screen and the third sub-screen, thereby generating a third screen output at 373. The third screen is comprised of the second screen and the third sub-screen, and the second screen in turn is comprised of the first screen and the second sub-screen. That is, the third screen is comprised of one main screen and three sub-screens. At this time, the second screen 372 operates like the main screen, and the third sub-screen operates like the sub-screen.

According to a preferred embodiment, each of the first scaler 340, the second scaler 350, the third scaler 360, and the fourth scaler 365 performs the functions above as a part of an integrated chip. It will be understood however that more than one IC may be used to implement the relevant features of a system according to the present invention, and such a system may be implemented without the use of an IC.

The screen display unit 390 allows the third screen to be displayed on a region of the main screen, and the third sub-screen to be displayed on a predetermined region of the main screen, thereby displaying the three sub-screens.

Hereinafter, the operation of real time channel grouping according to the third embodiment of the present invention will be described with reference to FIGS. 6, 9A, 9B, and 16.

Figure 9A:
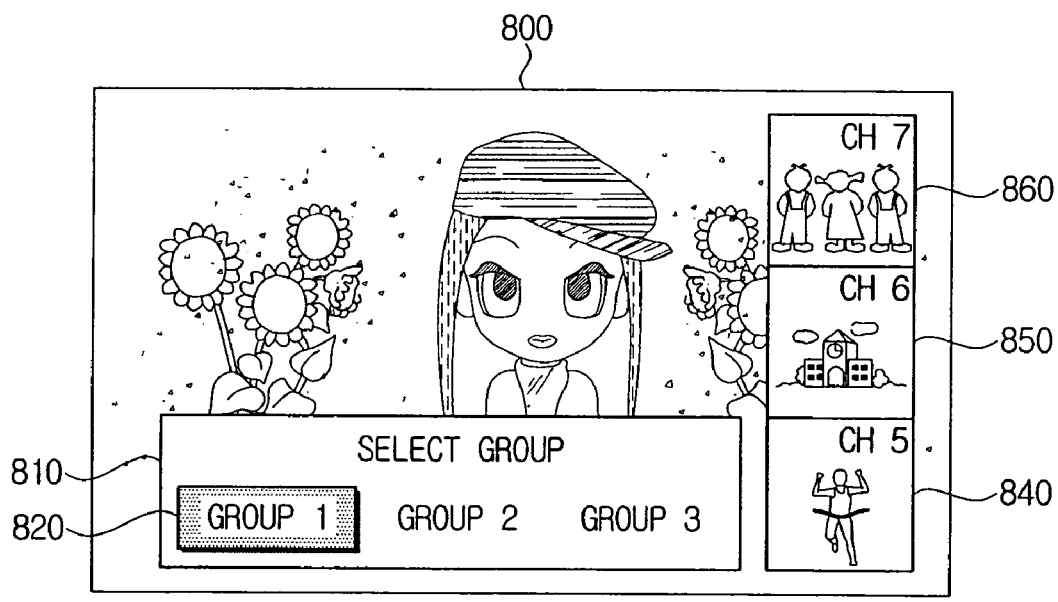
FIG. 9A is a view showing multi-PIP screen and group selection screen using GUI in the broadcasting that is received.
Figure 9B:
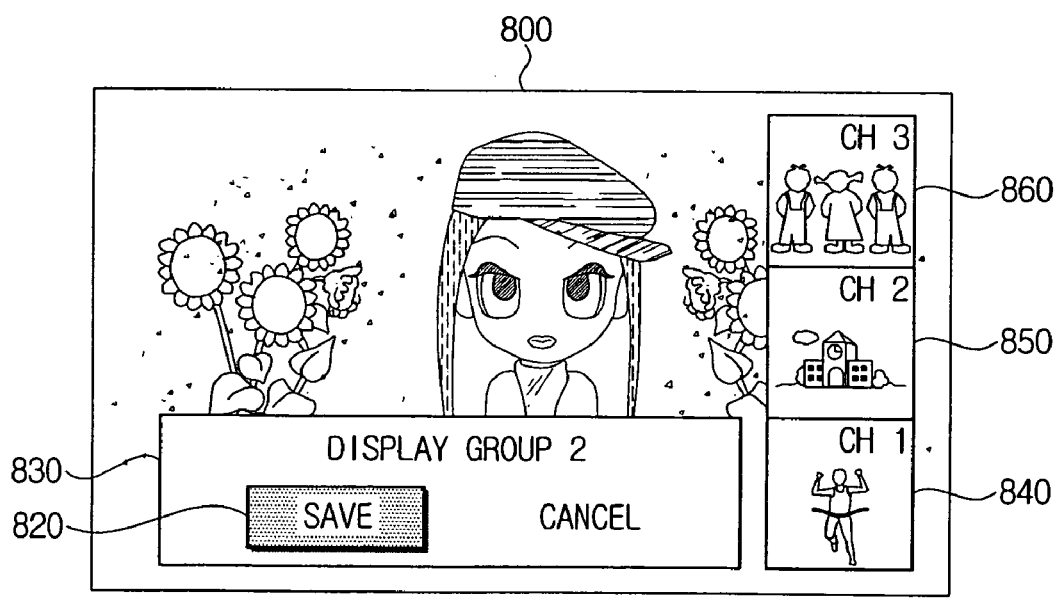
FIG. 9B is a view of GUI screen that is displayed for storing a selected channel in a group.
Figure 16:
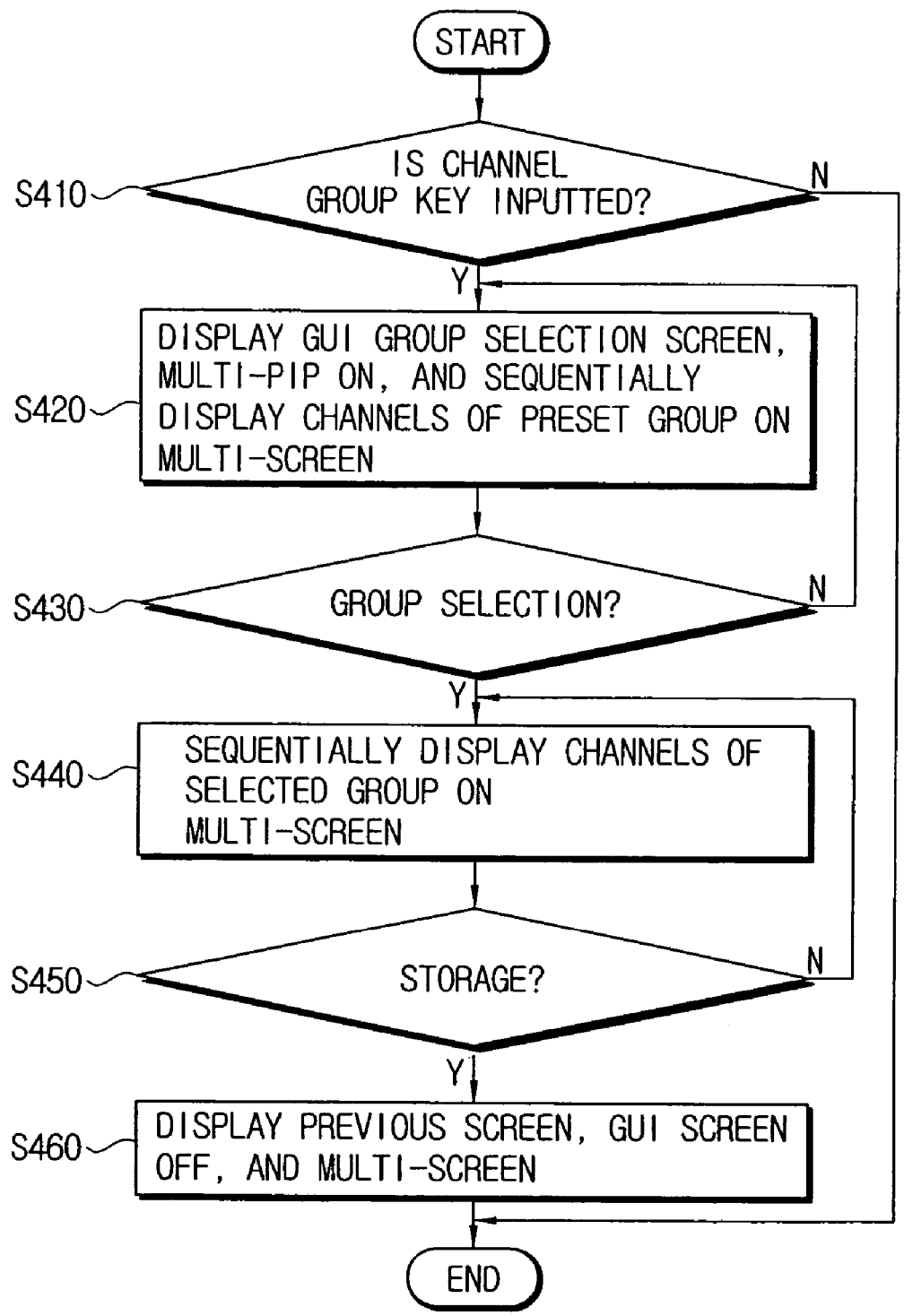
FIG. 16 is a flow chart explaining operations for grouping channels in real time according to the third embodiment of the present invention.

FIG. 9A is a view showing multi-PIP screen and group selection screen GUI transposed on the broadcasting that is received, FIG. 9B is a view of a GUI screen that is displayed for storing a selected channel in a group, and FIG. 16 is a flow chart explaining the operations for grouping channels in real time according to the third embodiment of the present invention.

As shown, when the user inputs the "channel group key" of the remote controller 315 or the input unit 310 for storing a broadcasting 800 in a specific group while watching the broadcasting 800 using the main tuner unit 322 (the step S410), the controlling unit 400 allows GUI screen 810 for selecting a group as shown in FIG. 9A from the GUI screen storage unit 401 to be displayed on a predetermined region of the screen display unit 390 superposed on the channel that is received. At the same time, the controlling unit 400 executes the ON operation of the multi-PIP function and controls the first sub-tuner unit 324, the second sub-tuner unit 326, and the third sub-tuner unit 328 to allow the channels included in preset group, "Group1", to be displayed on the sub-screens 840, 850, and 860, respectively (the step S420). For example, in the present embodiment, a case in which three groups are selectable, the user may select Group 2, the channels 5, 6, and 7 being set in "Group 1", and channels 1, 2, and 3 being set in "Group 2" is considered. Additionally, in the initial group selection screen display, a selection bar 820 is displayed on the preset group, "Group 1" and a desired group may be selected using the left and right selection keys (not shown). Accordingly, "the channel 5" being part of "Group 1" is displayed on the first sub-screen 840, "the channel 6" also part of "Group 1" is displayed on the second sub-screen 850, and "the channel 7" being part of "Group 1" is displayed on the third sub-screen 860 until the user selects a group (see FIG. 9A).

If the user does not select a group, the process iteratively performs the procedures beginning with the step S420. If the user selects "Group 2" in which to store the channel (the step S430), the controlling unit 400 displays another GUI screen 830 inquiring whether the channel that is currently received in the main screen is to be stored in Group 2, while displaying the channels stored in the selected group as shown in FIG. 9B, one channel on each sub-screen (the step S440).

It is desirable to display "save" indicating storage, and "cancel" indicating cancellation of the GUI screen 830, so as to allow the user to select the one he wishes. If the user wishes to store the received channel in the selected group using the selection window 820 (the step S450), the controlling unit 400 stores the channel that has been received in the selection group (Group 2) and performs the OFF operations of its associated GUI screen 830 and the multi-PIP screen (the step S460), and thereby the process ends. At the step S450, if the user does not wish to store the received channel in the selected group, the process iteratively performs the step S440, and if "the channel group key" is not inputted in the step S410, the process ends.

Hereinafter, in case the user establishes each group by iteratively performing the operations above, description will be made of how the channels stored in the each group on the multi-PIP screen are displayed.

Figure 11C:
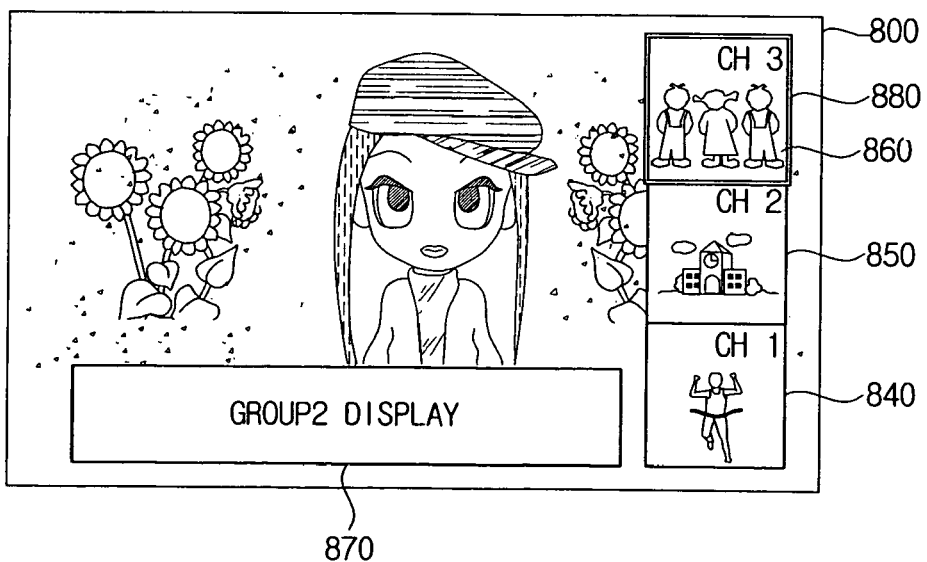
FIG. 11C is a view of a multi-PIP showing group display screen using GUI in the broadcasting that is received.
Figure 17:
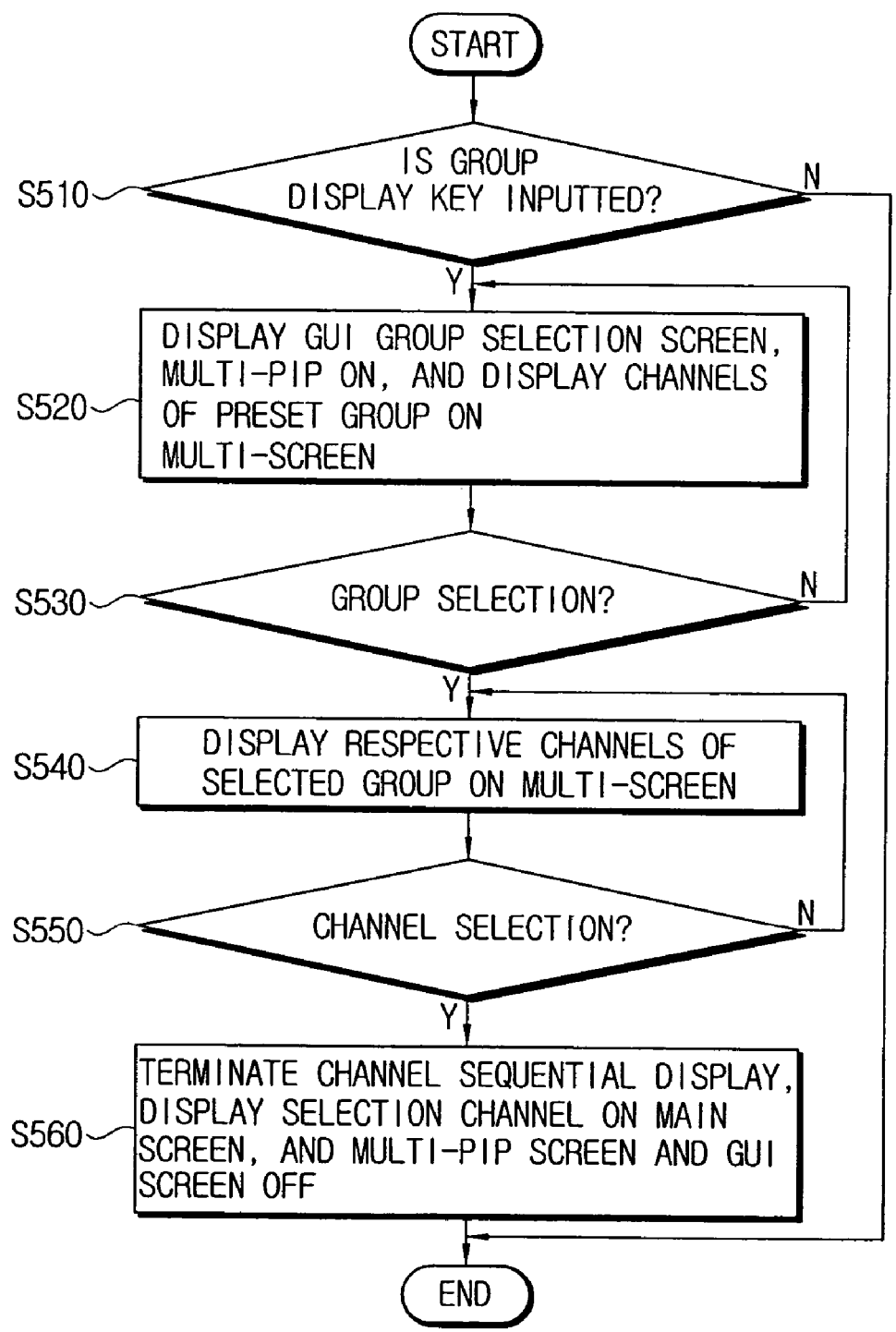
FIG. 17 is a flow chart showing procedures for selecting channels using group display key by user.

FIG. 11C is a multi-PIP view showing a GUI group display screen in the broadcasting that is received, and FIG. 17 is a flow chart showing procedures for selecting the channels using the "group display key" by user. As shown, if the user inputs the "group display key" of the remote controller 315 or the input unit 310 while watching the broadcasting through the screen display unit 390 (the step S510), the controlling unit 400 allows the screen (see FIG. 9A) for selecting group stored in the GUI screen storage unit 401 to be displayed on the screen display unit 390. Additionally, the controlling unit 400 performs the ON operation of the multi-PIP screen and concurrently allows the channels 1, 2 and 3 included in preset group (in the present embodiment, "Group1") to be displayed on each of the sub-screens 840, 850, and 860 (the step S520).

If the user does not select a group to be watched, the process iteratively performs the step S520. If the user selects a group to be displayed using the left and right selection keys (not shown) of the remote controller 315 or the input unit 310 (the step S530), as shown in FIG. 11C, the controlling unit 400 controls the sub-tuner units 324, 326, and 328 to allow the channels being set in the selected group to be displayed on each of the sub-screens 840, 850, and 860, and to allow GUI screen 870 indicating the channel that is currently selected, Group 2, to be displayed on the screen display unit 390 (the step S540).

If the user does not select the specific channel using the selection window 880 during the sequential display of the channels on the sub-screens 840, 850, and 860, the process iteratively performs the step S440. If the user selects the specific channel (the step S550), the controlling unit 400 performs the OFF operations of PIP screen and GUI screen 870 while allowing the selected channel to be displayed on the main screen (the step S560), and thereby the process ends. Then, if the "group display key" at step S510 is not selected, the process ends.

Although technical aspects of the present invention have been disclosed with reference to the appended drawings, and the preferred embodiments of the present invention corresponding to the drawings have been described, descriptions in the present specification are only for illustrative purposes, not for limiting the present invention.

Also, those who are skilled in the art will appreciate that various combinations, modifications, additions and substitutions are possible without departing from the scope and spirit of the present invention. Therefore, it should be understood that the present invention is limited only by the accompanying claims and the equivalents thereof, and includes the aforementioned combinations, modifications, additions and substitutions.

What is claimed is:

1. A real time channel grouping apparatus comprising:
a key input unit configured to process a preference channel group setting signal, a display demand signal, and a group selection signal;
a GUI screen storage unit configured to store user selection-guide information designating a channel as belonging to a first group of preference channels of a plurality of preference channels, according to the preference channel group setting signal and the display demand signal input from said key input unit;
a signal processing unit configured to output a screen to a display device, based on the user selection-guide information from the GUI screen storage unit and a content signal; and
a controlling unit configured to group the designated channel in the first group of preference channels according to the user selection-guide information from said GUI screen storage unit, and to control said signal processing unit to display on the display device the first group of preference channels with a user interface, broadcasting signals corresponding to each preset channel in the group of preference channels being iteratively and sequentially displayed for a predetermined period.

2. The apparatus of claim 1, wherein when at least one of the display demand signal and the preference channel group setting signal is inputted to said key input unit, said controlling unit enables display on the display device of the user interface for at least one of selecting a group of preference channels and designating the received channel as a preference channel belonging to the first group of preference channels.

3. The apparatus of claim 2, wherein the user interface includes display of a group number of a group of preference channels available for selection by the user, and when the user moves to the group number, the controlling unit allows display on the display device of the selected group of preference channels, each channel of the group of preference channels being serially displayed for a predetermined period.

4. The apparatus of claim 3, wherein when the user selects the group of preference channels to which the received channel is to belong, the controlling unit allows the received channel to be displayed on the display device, stores in said GUI screen storage unit the received channel as belonging to the selected group of preference channels, and performs an OFF operation of the user interface.

5. The apparatus of claim 3, wherein when the user selects for display a preference channel of a group of preference channels, the selected preference channel is displayed on the display device and the user interface is turned to an OFF state.

6. A real time channel grouping method comprising:
receiving a channel;
selecting a channel grouping mode;
displaying user selection-guide information according to the channel grouping mode and the received channel;
selecting a group of preference channels from a plurality of preference channels to which the received channel is to belong;
sequentially displaying channels of the selected group of preference channels, broadcasting signals corresponding to each preset channel of the group of preference channels being iteratively displayed for a predetermined period; and
storing the received channel as belonging to the selected group of preference channels.

7. The method of claim 6, wherein the user selection-guide information is such that at least one group of preference channels that is available for selection by the user is displayed.

8. The method of claim 6, wherein said displaying of the user selection-guide information further comprises sequentially displaying channels included in the group of preference channels for a predetermined period.

9. The method of claim 6, wherein said storing of the received channel further comprises displaying the received channel on the display device.

10. The method of claim 6, further comprising displaying a channel group display mode.

11. The method of claim 10, wherein said displaying of the channel group display mode comprises:
inputting a channel group display command;
displaying the user selection-guide information according to the input channel group display command;
selecting the group of preference channels to be received;
selecting a viewing channel of the group of preference channels to be received; and
displaying the viewing channel for watching.

12. The method of claim 11, wherein displaying the user selection-guide information further comprises sequentially displaying for a predetermined period each of the channels of the selected group of preference channels.

13. The method of claim 11, further comprising sequentially displaying channels of the selected group of preference channels for a predetermined period.

14. The method of claim 11, wherein the user guide information is such that at least one group of preference channels of the plurality of preference channels available for selection by the user is displayed.

15. Real time channel grouping apparatus comprising:
a key input unit configured to process a preference channel grouping setting signal, a display demand signal, and a group selection signal input through external input means;
a GUI screen storage unit configured to store user selection-guide information designating a channel as belonging to a first group of preference channels of a plurality of preference channels, according to the preference channel grouping setting signal and the display demand signal from the key input unit;
a PIP signal processing unit configured to process a content signal as a main screen and a sub-screen;
a synthesizer configured to synthesize a screen based on the output of the PIP signal processing unit and the user selection-guide information from the GUI screen storage unit, and to output the synthesized screen to a display device; and
a controlling unit configured to group the designated channel as a preference channel of the group of preference channels according to the user selection-guide information signal, to enable the group of preference channels to be displayed on the display device with the user guide information of the GUI screen storage unit and allowing broadcasting signals corresponding to preset channels of the group of preference channels to be iteratively and sequentially displayed on the sub-screen for a predetermined period by performing the ON operation of the PIP function.

16. The apparatus of claim 15, wherein when the display demand signal is inputted, the controlling unit allows guide information for selecting a group of preference channels of the plurality of preference channels to display, and when the preference channel grouping setting signal is inputted, the controlling unit stores the received channel as belonging to the group of preference channels, the controlling unit allowing the received channel to be displayed on the main screen.

17. The apparatus of claim 16, wherein the guide information for selecting the group of preference channels is such that group identifier information for groups of the plurality of preference channels that are available for selection by the user is displayed, and when the user moves to a group identifier of a group using the group selection signal, the controlling unit allows channels of the group designated to be displayed on the sub-screen, each of the channels of the group of preference channels being sequentially displayed for a predetermined period.

18. The apparatus of claim 16, wherein when the user selects the group of preference channels in which the received channel is to be stored, the controlling unit allows the received channel to be displayed on the display device, stores the received channel in the selected group of preference channels, and performs the OFF operation of the PIP function.

19. A real time channel grouping method comprising:
receiving a channel;
selecting a channel grouping mode;
displaying user guide information according to said selected channel grouping mode, and displaying the received channel on a main screen and iteratively and sequentially displaying each channel of a play group of preference channels of a plurality of preference channels for a predetermined period on a sub-screen, by turning ON an operation of the PIP function;
selecting a first group of preference channels of the plurality of preference channels to which the received channel is to be stored;
sequentially displaying for a predetermined period on the sub-screen broadcasting signals corresponding to each preset channel of the first group of preference channels; and
storing the received channel in the first group of preference channels.

20. The method of claim 19, wherein the user guide information is such that at least one group of preference channels available for user selection is displayed.

21. The method of claim 19, wherein said storing the received channel comprises storing the received channel in the selected group of preference channels, displaying on the display device the received channel, and turning OFF of the PIP function and of said display of the user guide information.

22. The method of claim 21, further comprising displaying a channel group display mode.

23. The method of claim 22, wherein said displaying channel group display mode comprises:
inputting a channel group display key;
displaying user guide information according to the display group key input;
selecting the group of preference channels to be received;
selecting as a channel to be viewed a channel of the group of preference channels; and
displaying the selected channel for viewing.

24. The method of claim 23, wherein said displaying of the user guide information further comprises sequentially displaying on the sub-screen for a predetermined period each channel of the selected group of preference channels.

25. A real time channel grouping apparatus comprising:
a key input unit configured to process a preference channel grouping setting signal, a display demand signal, and a group selection signal input through external input means;
a GUI screen storage unit configured to store user selection-guide information designating a channel as belonging to a first group of preference channels of a plurality of preference channels according to the preference channel grouping setting signal and the display demand signal;
a PIP signal processing unit configured to process content signals received by a main tuner and a plurality of sub-tuners and to provide a main screen signal and a plurality of sub-screen signals;
a synthesizer configured to synthesize the main screen signal of the PIP signal processing unit and the user selection-guide information from the GUI screen storage unit and to output a composite screen to a display device; and
a controlling unit configured to group the designated channel in the group of preference channels according to the user selection-guide information from said GUI screen storage unit, to allow display of the designated channel with display of information based on the user selection-guide information, and to display broadcasting signals corresponding to each preset channel of the first group of preference channels iteratively and sequentially for a predetermined period on a sub-screen of the plurality of sub-screens of the display device by performing an ON operation of a multi-PIP function.

26. The apparatus of claim 25, wherein when at least one of the display demand signal and the preference channel grouping setting signal is inputted to said key input unit, said controlling unit enables display on the main screen of the display device information based on the user selection-guide information for at least one of selecting a group of preference channels and designating the received channel displayed on the main screen of the display device as a preference channel belonging to the first group of preference channels.

27. The apparatus of claim 26, wherein the information based on the user-guide information for selecting the first group of preference channels is such that groups of the plurality of preference channels available for selection by the user are displayed, and when the user selects the first group using the group selection signal, the controlling unit enables channels of the group selected to be respectively displayed on the sub-screens.

28. The apparatus of claim 26, wherein when the user selects a group in which the received channel is to be stored, the controlling unit allows the received channel to be displayed on the display device by storing the received channel in the selected group and performing an OFF operation of the multi-PIP function.

29. The apparatus of claim 25, wherein when the preference channel display demand signal is inputted, the controlling unit allows the received channel and the user selection-guide information for selecting a group of the plurality of preference channels to display the received channel on the main screen, and channels of the group of preference channels to which the received channels belongs to be displayed on respective sub-screens by performing the ON operation of the multi-PIP function.

30. A real time channel grouping method comprising:
receiving a channel;
selecting a channel grouping mode;

displaying user selection-guide information according to the channel grouping mode, and allowing the received channel to be displayed on a main screen and channels included in a play group of preference channels of a plurality of preference channels to be displayed on a sub-screens by performing an ON operation of a multi-PIP function, broadcasting signals corresponding to each preset channel of the play group of preference channels being iteratively and sequentially displayed on the multi-sub-screens for a predetermined period;

selecting a first group of preference channels of the plurality of preference channels in which the received channel is to be stored;

displaying a channel of the first group of preference channels on the respective sub-screens; and storing the received channel in the first group of preference channels.

31. The method of claim 30, wherein said storing comprises storing the received channel in the first group of preference channels and displaying on a display device the received channel by performing an OFF operation of the PIP function and the user selection guide information.

32. The method of claim 30, further comprising displaying a channel group display mode.

33. The method of claim 32, wherein said displaying the channel group display mode comprises:

inputting a channel group display key;

displaying the user selection-guide information according to the display key input;

selecting the play group of preference channels to be received;

selecting a viewing channel of the play group of preference channels to be received; and displaying the selected viewing channel to enable watching of the selected viewing channel.

* * * * *